United States Patent
Yoon et al.

(10) Patent No.: US 11,036,451 B2
(45) Date of Patent: Jun. 15, 2021

(54) DISPLAY APPARATUS AND CONTROL METHOD THEREOF

(71) Applicant: SAMSUNG ELECTRONICS CO., LTD., Suwon-si (KR)

(72) Inventors: Sukun Yoon, Suwon-si (KR); Jongha Woo, Suwon-si (KR); Cheulhee Hahm, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/583,735

(22) Filed: Sep. 26, 2019

(65) Prior Publication Data

US 2020/0104087 A1   Apr. 2, 2020

(30) Foreign Application Priority Data

Sep. 27, 2018   (KR) .................. 10-2018-0115347

(51) Int. Cl.
  *G06F 3/14*    (2006.01)
  *H04W 4/50*   (2018.01)
  *H04W 4/80*   (2018.01)
  *H04W 12/0471*   (2021.01)

(52) U.S. Cl.
  CPC .............. *G06F 3/14* (2013.01); *H04W 4/50* (2018.02); *H04W 4/80* (2018.02); *H04W 12/0471* (2021.01)

(58) Field of Classification Search
  CPC . G06F 3/14; H04W 4/80; H04W 4/50; H04W 12/04071; H04W 4/02
  See application file for complete search history.

(56) References Cited

U.S. PATENT DOCUMENTS

| 5,805,201 A | 9/1998 | Fujiwara |
| 8,576,071 B2* | 11/2013 | Lo .................... G06F 21/35 340/5.2 |
| 10,536,738 B2 | 1/2020 | Garcia et al. |
| 2001/0005860 A1* | 6/2001 | Lazaridis ............... H04W 4/00 709/245 |

(Continued)

FOREIGN PATENT DOCUMENTS

| CN | 1679077 A | 10/2005 |
| CN | 104756514 A | 7/2015 |

(Continued)

OTHER PUBLICATIONS

International Search Report and Written Opinion dated Jan. 7, 2020 in counterpart International Application No. PCT/KR2019/012597.

(Continued)

*Primary Examiner* — Lewis G West
(74) *Attorney, Agent, or Firm* — Nixon & Vanderhye P.C.

(57) ABSTRACT

Provided is a display apparatus including a display; a memory configured to store at least one instruction; a communicator comprising communication circuitry configured to communicate with a mobile device via at least one wireless network, the at least one wireless network including, for example, and without limitation, a Bluetooth low energy (BLE) network; and a controller including at least one processor configured to execute at least one of the at least one instruction stored in the memory.

22 Claims, 15 Drawing Sheets

(56) References Cited

U.S. PATENT DOCUMENTS

| | | | |
|---|---|---|---|
| 2002/0095222 A1* | 7/2002 | Lignoul | G06F 21/84 700/13 |
| 2004/0041849 A1 | 3/2004 | Bock et al. | |
| 2008/0125101 A1* | 5/2008 | Bakos | H04M 1/72569 455/418 |
| 2008/0177994 A1* | 7/2008 | Mayer | G06F 9/4418 713/2 |
| 2009/0064338 A1* | 3/2009 | Campbell | G06F 11/3058 726/26 |
| 2010/0188279 A1 | 7/2010 | Shamilian et al. | |
| 2011/0028093 A1 | 2/2011 | Patel et al. | |
| 2013/0259230 A1 | 10/2013 | Polo et al. | |
| 2014/0068645 A1 | 3/2014 | Badros et al. | |
| 2014/0155031 A1* | 6/2014 | Lee | H04W 4/20 455/411 |
| 2015/0123919 A1 | 5/2015 | Yamada et al. | |
| 2015/0189070 A1* | 7/2015 | Baker | H04M 1/72572 715/738 |
| 2015/0228132 A1* | 8/2015 | Geerlings | G08C 17/02 340/5.22 |
| 2015/0286810 A1 | 10/2015 | Lebert | |
| 2015/0373749 A1 | 12/2015 | Palin et al. | |
| 2016/0034019 A1 | 2/2016 | Seo et al. | |
| 2016/0117076 A1* | 4/2016 | Kim | H04M 1/72519 715/735 |
| 2018/0266751 A1* | 9/2018 | Lim | F25D 29/00 |
| 2019/0239078 A1 | 8/2019 | Lee et al. | |
| 2019/0241154 A1* | 8/2019 | Elangovan | B60R 25/245 |
| 2020/0005279 A1* | 1/2020 | Raquepaw | G06Q 20/3224 |

FOREIGN PATENT DOCUMENTS

| | | |
|---|---|---|
| JP | H09-284666 | 10/1997 |
| KR | 10-2013-0111165 | 10/2013 |
| KR | 10-2014-0074155 | 6/2014 |
| KR | 10-2015-0136645 | 12/2015 |
| KR | 10-2016-0014915 | 2/2016 |
| KR | 10-2016-0080567 | 7/2016 |
| KR | 10-2017-0006760 | 1/2017 |

OTHER PUBLICATIONS

Extended Search Report dated Jan. 16, 2020 in counterpart European Patent Application No. 19199956.4.
European Examination Report dated Jun. 16, 2020 for EP Application No. 19199956.4.
Chinese Office Action dated Apr. 27, 2021 for CN Application No. 201910931813.5.

* cited by examiner

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2018-0115347, filed on Sep. 27, 2018, in the Korean Intellectual Property Office, the disclosure of which is incorporated by reference herein in its entirety.

BACKGROUND

1. Field

The disclosure relates to a control method of a display apparatus and a display apparatus therefor.

For example, the disclosure relates to a control method of a display apparatus communicating with a mobile device connected thereto via, for example, a Bluetooth Low Energy (BLE) network, and a display apparatus therefor.

2. Description of Related Art

As mobile devices have been widely used, technologies whereby a mobile device and an electronic device are connected to each other via a wireless network and are used in connection with each other are being developed. The mobile device may be any type of electronic devices that users can carry, and the electronic device connected to the mobile device via the wireless network may be a display apparatus.

In addition, technologies whereby a plurality of electronic devices that are not portable are controlled by technology such as home IoT platform to be used or controlled by being connected to a mobile device are being developed.

The wireless network may be a network conforming to a Bluetooth communication standard for establishing low-power wireless communication. In more detail, the Bluetooth communication standard may include a Bluetooth Low Energy (BLE) communication standard, and the wireless network may include a BLE network.

A display apparatus connected to a mobile device via BLE is controllable based on a BLE signal transmitted from the mobile device.

SUMMARY

Embodiments of the disclosure may provide a control method of a display apparatus capable of providing an predetermined application, and a display apparatus therefor.

For example, when an operation of a display apparatus is controlled using a wireless communication scheme, such as, for example, BLE, as described above, it is necessary to control an operation performed by the display apparatus to meet a user's intention. Accordingly, a control method of a display apparatus, which is capable of controlling an operation of an ambient service using wireless communication, such as, BLE, in accordance with a user's intention, and a display apparatus therefor are provided.

Additional aspects will be set forth in part in the description which follows and, in part, will be apparent from the description.

According to an example embodiment of the disclosure, a display apparatus includes a display, a memory configured to store at least one instruction, a communicator comprising communication circuitry configured to communicate with a mobile device via at least one wireless network, the at least one wireless network including a Bluetooth low energy (BLE) network, and a controller including at least one processor, wherein, at least one of the at least one instruction, when executed by the at least one processor, controls the display apparatus to: control a process to not be started until a mobile device registered to control on or off control of an predetermined application is sensed, wherein the process may be configured to automatically end the predetermined application in response to the registered mobile device not being sensed after a first point of time at which the predetermined application is started. According to an example embodiment of the disclosure described above, the display apparatus is capable of maintaining the predetermined application without ending execution of the predetermined application, even when a registered user is not located near the display apparatus. Accordingly, users other than the registered user may be provided with the predetermined application to increase the users' satisfaction.

The the at least one of the at least one instruction, when executed by the at least one processor, controls the display apparatus to control the predetermined application to remain on until the registered mobile device is sensed after the first point of time. According to an example embodiment of the disclosure described above, the display apparatus is capable of maintaining the predetermined application to be on until the registered mobile device is sensed, when a user registered at a point of time at which the predetermined application is started is not located near the display apparatus. Thus, inconvenience that may be caused to some of a plurality of users when the predetermined application is suddenly ended may be removed.

The at least one of the at least one instruction, when executed by the at least one processor, controls the display apparatus to determine whether the registered mobile device is sensed, based on a BLE signal received via the BLE network. According to an example embodiment of the disclosure described above, the display apparatus is capable of sensing the registered mobile device quickly and easily by scanning the BLE signal implemented with low power.

The process may include a process of determining whether the predetermined application is to be automatically ended, based on sensing the registered mobile device.

The at least one of the at least one instruction, when executed by the at least one processor, controls the display apparatus to determine whether the registered mobile device is sensed for a first time period from the first point of time, and re-determine whether the registered mobile device is sensed after a second time period from the first point of time, in response to the registered mobile device not being sensed as a result of the determination.

The at least one of the at least one instruction, when executed by the at least one processor, controls the display apparatus to re-determine whether the registered mobile device is sensed at intervals of the second time period based on the registered mobile device not being sensed as a result of the re-determination, and control the process to not be started until the registered mobile device is sensed.

The at least one of the at least one instruction, when executed by the at least one processor, controls the display apparatus to control the process to be started based on the registered mobile device being sensed as a result of the re-determination.

According to an example embodiment of the disclosure described above, the display apparatus may determine whether the registered mobile device is sensed at certain time intervals (e.g., at intervals of the first time period or the like), and respond flexibly to a change of a situation (e.g., disappearance or appearance of the registered mobile device) by starting or not starting the process according to a result of the identification.

The at least one of the at least one instruction, when executed by the at least one processor, controls the display apparatus to determine whether the registered mobile device is sensed for a first time period from the first point of time, and control the process to be started based on the registered mobile device being sensed as a result of the determination.

The at least one of the at least one instruction, when executed by the at least one processor, controls the display apparatus to, in response to the registered mobile device being sensed as a result of the determination, re-determine whether the registered mobile device is sensed for the first time period from a third point of time, and perform an operation of ending the predetermined application based on the registered mobile device not being sensed as a result of the re-determination, the third point of time being later than the first point of time by a second time period.

The at least one of the at least one instruction, when executed by the at least one processor, may control the display apparatus to output a first user interface screen informing an end of the predetermined application and automatically end execution of the predetermined application, in response to the registered mobile device not being sensed as a result of the re-determination.

The at least one of the at least one instruction, when executed by the at least one processor, controls the display apparatus to output a second user interface screen for selecting whether the predetermined application is to be executed based on the registered mobile device not being sensed as a result of the re-determination, and determine whether the predetermined application is to be ended, based on a user input received through the second user interface screen.

According to an example embodiment of the disclosure described above, the display apparatus may identify a user's final intention by outputting the second user interface screen, even when the predetermined application is to be ended because the registered mobile device is not sensed. Accordingly, whether the predetermined application is to be executed or ended may be determined to be more consistent with the user's intention.

The at least one of the at least one instruction, when executed by the at least one processor, may control the display apparatus to control the predetermined application to be maintained, in response to a user input corresponding to rejection of the end of the predetermined application being received through the second user interface screen.

According to another example embodiment of the disclosure, a control method of a display apparatus capable of providing an predetermined application is provided. The control method includes starting the predetermined application at a first point of time, and controlling a process to not be started until a registered mobile is sensed by scanning, the process being configured to automatically end the predetermined application.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
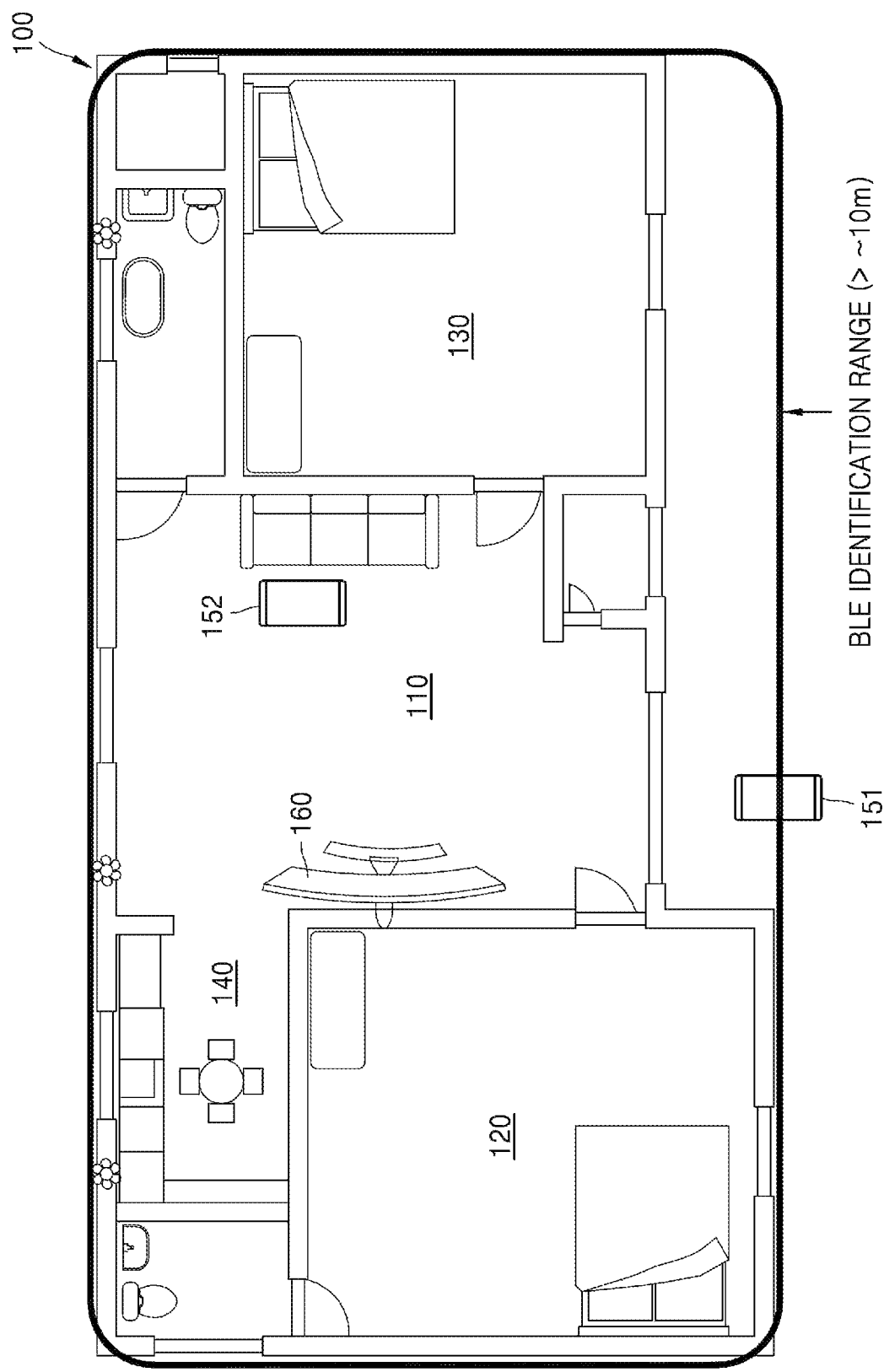
FIG. 1 is a diagram illustrating a plurality of electronic devices connectable in a home via a wireless network, such as a BLE network according to an embodiment of the disclosure.

Hereinafter, various example embodiments of the disclosure will be described in greater detail with reference to the accompanying drawings. However, the disclosure may be embodied in many different forms and is not limited to the example embodiments of the disclosure set forth herein. For clarity, parts not related to explaining the disclosure may be omitted in the drawings, and like components are denoted by like reference numerals throughout the disclosure.

Throughout the disclosure, when an element is referred to as being "connected" to another element, it should be understood that the element is "directly connected" to the other element or is "electrically connected" to the other element while having another element therebetween. When an element is referred to as "including" another element, it should be understood that the element may further include other elements unless stated otherwise.

As used herein, expressions such as "in some embodiments" or "in one embodiment" do not necessarily refer to the same embodiment of the disclosure.

Some embodiments of the disclosure may be represented by functional block configurations and various operations. Some or all of these functional blocks may be implemented by various numbers of hardware and/or software configurations for performing particular functions. For example, functional blocks as set forth herein may be implemented by one or more processors or microprocessors or by circuit configurations for certain functions. For example, the functional blocks as set forth herein may be implemented in various programming or scripting languages. The functional blocks may be implemented with an algorithm executed by one or more processors. Related art may be employed in the disclosure for electronic configuration, signal processing, and/or data processing. Terms such as "module" and "configuration" may be widely used and should not be understood as being limited to mechanical and physical configurations.

In the drawings, lines or members for connection between components are merely illustrative of functional connections and/or physical or circuit connections. Connections between components of a device may be represented by various functional connections, physical connections, or circuit connections that are replaceable or added.

Throughout the disclosure, the expression "at least one of a, b or c" indicates only a, only b, only c, both a and b, both a and c, both b and c, all of a, b, and c, or variations thereof.

The disclosure will now be described in greater detail with reference to the accompanying drawings.

FIG. 1 is a diagram illustrating a plurality of electronic devices connectable in a home via a low power wireless communication network, such as, for example, and without limitation, a Bluetooth Low Energy (BLE) network, or the like, according to an example embodiment of the disclosure. In FIG. 1, the plurality of electronic devices connectable via the BLE network may include a display apparatus and a mobile device. In the disclosure, various example embodiments will be illustrated and described using BLE as an example of a low energy wireless communication network for ease of description. However, it will be understood that any suitable wireless network may be used and that the disclosure is not limited to any particular wireless communication network.

A display apparatus according to an embodiment of the disclosure may be connected to another electronic device via a wireless communication network. For example, a display apparatus according to an embodiment of the disclosure may be connected to a mobile device via the BLE network. The BLE network may refer, for example, to a wireless network via which data or a signal is transmitted or received using a BLE signal. The BLE signal is a signal formed according to a BLE communication standard and may be in various forms such as a BLE packet, an iBeacon, or the like. However, as set forth above, BLE is simply an example used for ease and convenience of description, and the disclosure is not limited thereto.

For example, the display apparatus according to an embodiment of the disclosure may transmit data to or receive data from at least one electronic device adjacent (e.g., within a communication proximity of) thereto, may be paired with at least one electronic device adjacent thereto, may remotely control at least one electronic device adjacent thereto, or may be remotely controlled by at least one electronic device adjacent thereto, via a wireless communication network. The wireless communication network may, for example, and without limitation, be the BLE network.

The display apparatus according to an embodiment of the disclosure may transmit a BLE signal to or receive a BLE signal from a mobile device via the BLE network. For example, the display apparatus according to an embodiment of the disclosure may receive or scan a BLE signal transmitted from the mobile device. The mobile device may transmit a BLE signal to receive a BLE signal from the display apparatus.

FIG. 1 illustrates an example in which a display apparatus according to an embodiment of the disclosure may, for example, be a display apparatus 160 that may be disposed to be attached to a wall in a home 100.

The display apparatus 160 may, for example, and without limitation, be a device configured to visually output content, advertisements, guide information, or a user interface screen to a user, and may be in various forms, such as, for example, and without limitation, a TV, a digital broadcasting terminal, and the like. The display apparatus 160 may be in a form included in an electronic device such as, for example, and without limitation, a refrigerator (e.g., a display inserted into a front surface of the refrigerator), or the like. The display apparatus 160 may, for example, and without limitation, be fixedly disposed in a certain space.

FIG. 1 illustrates an example spatial arrangement of the home 100. A space in the home 100 may, for example, be divided into bedrooms 120 and 130, a kitchen 140, and a living room 110. The display apparatus 160 may be disposed, for example, in the living room 110.

Members of the home 100 may be users of the display apparatus 160. In FIG. 1, it is illustrated, by way of example, that there are two members in the home 100, and the two members, e.g., two users of the display apparatus 160, may own mobile devices 151 and 152, respectively. The mobile device 151 or 152 and the display apparatus 160 may be connected to each other a wireless communication network.

The mobile device 152 among the mobile devices 151 and 152 will be described below as an example. The mobile device 152 may be a mobile computing device, such as, for example, and without limitation, a wearable device, a smart phone, a tablet PC, a personal digital assistant (PDA), a laptop computer, a media player, a micro-server, a global positioning system (GPS), or the like.

The mobile device 152 and the display apparatus 160 may be connected to each other via a Home Internet-of-Things (IoT) platform. For example, the display apparatus 160 and the mobile device 152 may be connected to each other via a wireless communication network.

A case in which the display apparatus 160 and the mobile device 152 communicate with each other via the BLE network will be described below as a non-limiting example.

In an embodiment of the disclosure, the display apparatus 160 may be operated under control of the mobile device 152. The display apparatus 160 may identify a position of the mobile device 152 and automatically execute a service, e.g., an ambient service, an operation, etc.

When the mobile device 152 transmits a BLE signal, the display apparatus 160 is capable of identifying the BLE signal when the display apparatus 160 is located within a certain distance (e.g., within a specified communication range (also referred to herein as "adjacent")) from the mobile device 152. The display apparatus 160 is capable of identifying the BLE signal when the BLE signal is transmitted within the certain distance. A range in which the display apparatus 160 is capable of identifying the BLE signal transmitted from an external device (e.g., the mobile device 152) will be hereinafter referred to, for example, and without limitation, as a "BLE identification range" or a "BLE signal identification range".

For example, the BLE signal identification range may be about 10 meters. When the mobile device 152 transmits the BLE signal at a location outside the home 100, the display apparatus 160 may not be capable of identifying the BLE signal.

The display apparatus 160 may perform a certain operation or control the execution of the operation using the BLE signal identification range, based on the BLE signal transmitted from the mobile device 152. For example, the ambient service provided from the display apparatus 160 may be controlled based on the BLE signal transmitted from the mobile device 152.

The ambient service may refer, for example, to a new application or service of the display apparatus 160 such as, for example, and without limitation, as a TV, and may be a service showing a meaningful screen instead of a black screen when the TV is turned off. A screen of the display apparatus 160 on which the ambient service is being executed will be described in greater detail with reference to FIG. 2 below.

Figure 2:
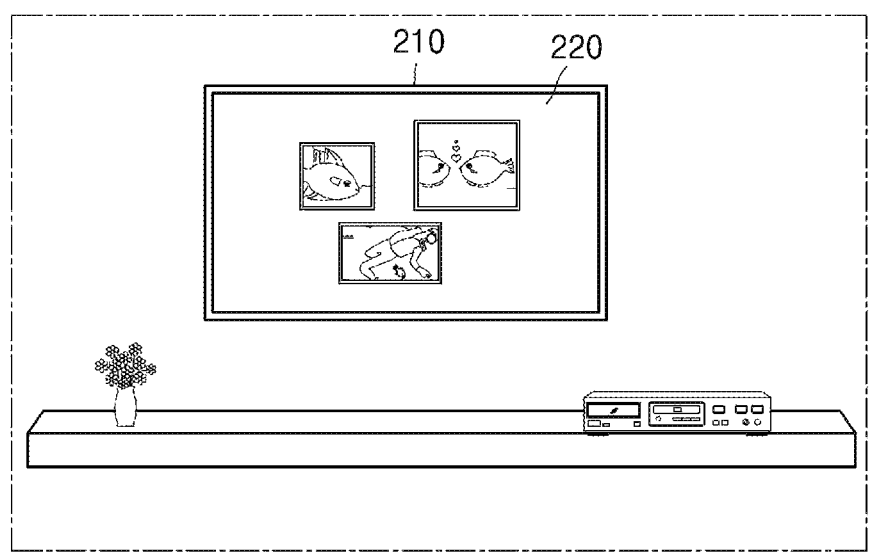
FIG. 2 is a diagram illustrating an example display apparatus capable of providing an ambient service according to an embodiment of the disclosure.

FIG. 2 is a diagram illustrating an example display apparatus on which an ambient service is provided according to an example embodiment of the disclosure. A display apparatus 210 of FIG. 2 according to an embodiment of the disclosure corresponds to the display apparatus 160 of FIG. 1 and thus a description of parts thereof that are same as those of the display apparatus 160 FIG. 1 may not be repeated here.

In general, when a TV is turned off, the TV is seen as a black screen and no image is displayed thereon. The ambient service is a service for displaying a meaningful screen, such as a famous painting, a photograph, or a clock, on a display of the TV instead of a black image, when the TV is turned off. When a user does not view content transmitted from a broadcasting station or the like, the ambient service may show a meaningful screen, such as, for example, and without limitation, a famous painting, a photograph, a clock, or the like, on the display. For convenience of explanation, a screen output while the ambient service is executed will be hereinafter referred to as an "ambient screen".

Referring to FIG. 2, the display apparatus 210 may display at least one photograph on a display 220 thereof. The display apparatus 210 may display at least one photograph so that a user may recognize the display apparatus 210 as a picture frame. In FIG. 2, the display apparatus 210 may function as an electronic frame to display a screen corresponding to a picture frame.

In an embodiment of the disclosure, a BLE signal transmitted from a mobile device may be used to control an operation of the ambient service provided from the display apparatus 210.

An operation of a display apparatus capable of controlling the ambient service based on a BLE signal will be described with reference to FIGS. 3 and 4 below.

Figure 3:
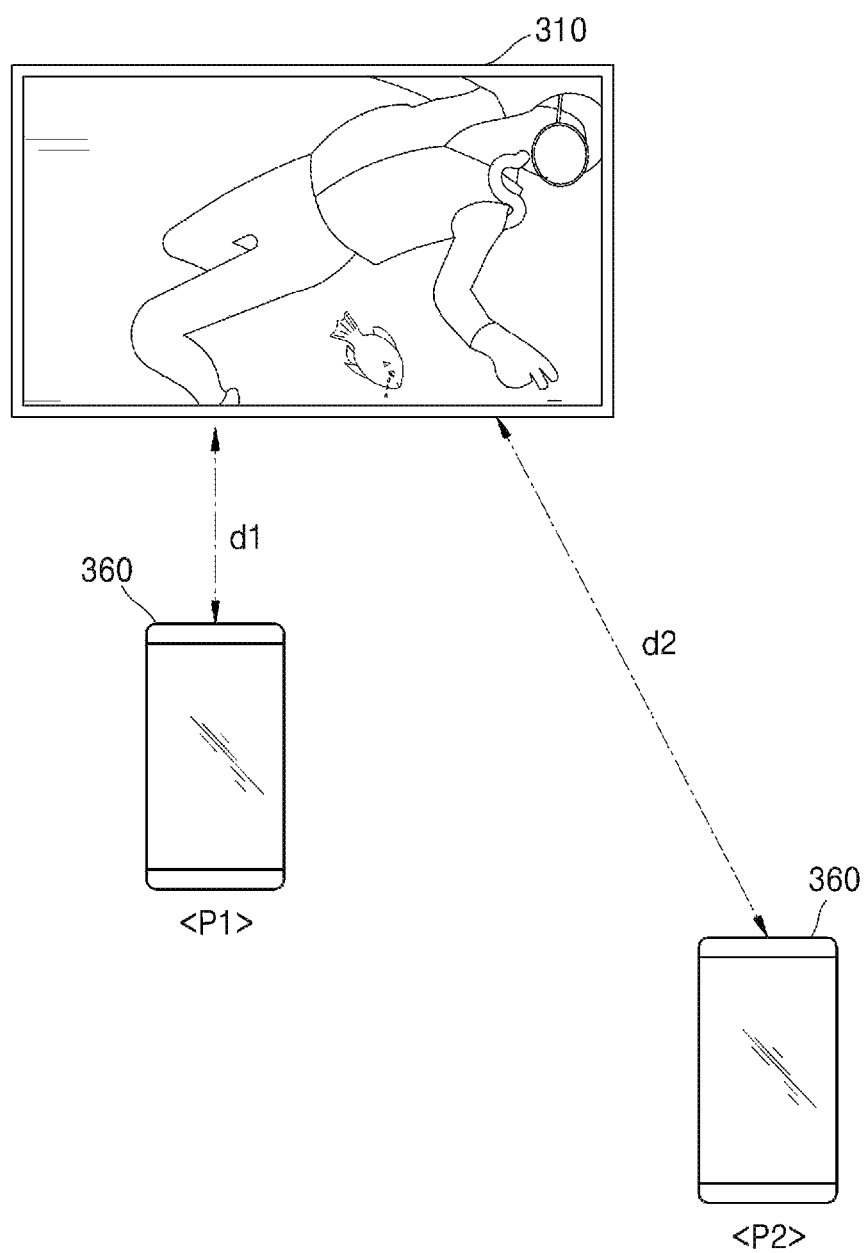
FIG. 3 is a diagram illustrating an example display apparatus capable of establishing communication via a Bluetooth low energy (BLE) network according to an embodiment of the disclosure.

FIG. 3 is a diagram illustrating an example display apparatus capable of establishing communication via the BLE network according to an embodiment of the disclosure. In FIG. 3, a display apparatus 310 may correspond to the display apparatus 210 of FIG. 2.

Referring to FIG. 3, the display apparatus 310 according to an embodiment of the disclosure may identify a BLE signal transmitted from a mobile device 360. The display apparatus 310 may scan the BLE signal continuously or at certain time intervals. The display apparatus 310 may transmit a BLE signal to the mobile device 360, and scan a BLE signal transmitted from the mobile device 360 when the mobile device 360 transmits the BLE signal to the display apparatus 310 in response to the BLE signal transmitted from the display apparatus 310. The BLE signal may be in various forms such as, for example, and without limitation, a BLE packet, an iBeacon, and the like. Accordingly, a case in which the display apparatus 310 receives a BLE signal may be understood to include a case a BLE signal that is in one of various forms such as, for example, and without limitation, a BLE packet and an iBeacon is received.

The mobile device 360 may function as a transmitting end transmitting the BLE signal, and the display apparatus 310 may function as a receiving end receiving the BLE signal. The display apparatus 310 may be an apparatus that receives a BLE signal and is controlled by the received BLE signal. For example, the display apparatus 310 may be turned on or off, based on a BLE signal received from the mobile device 360, or may be capable of maintaining or ending execution of the ambient service.

Hereinafter, "receiving a BLE signal" may be understood to include identifying the BLE signal by scanning the BLE signal at certain time intervals or continuously. "Receiving a BLE signal" may be understood to include requesting to transmit the BLE signal and receiving the BLE signal corresponding to the request.

Not only the mobile device 360 but also a mobile electronic product (e.g., a smart watch, a tablet PC or the like) is applicable as a transmitting end. In addition, not only the display apparatus 310 but also an electronic product having a BLE scan function (e.g., a speaker or a refrigerator) is applicable as a receiving end. A BLE signal (e.g., a BLE packet) is transmitted from the transmitting end continuously or in response to a periodic request. The receiving end performs BLE scanning at a set time or at periodic time intervals or requests the mobile device 360 serving as the transmitting end to transmit a BLE signal (e.g., a BLE packet).

The mobile device 360 serving as the transmitting end may be provided with a Bluetooth communication module (not shown) capable of transmitting a BLE signal, and an application for BLE advertisement configuration. The BLE advertisement may refer to either transmitting a BLE signal according to the BLE communication standard or a transmitted BLE signal. The BLE signal may be transmitted in a packet form (e.g., a 'BLE advertise packet', a 'BLE advertising packet' or the like) according to the BLE advertisement configuration.

The display apparatus 310 serving as the receiving end may be provided with a Bluetooth communication module (not shown) to receive a BLE signal, and may perform a certain operation, based on the BLE signal.

FIG. 3 illustrates an example in which a BLE signal receivable range is denoted by d1, and d2 is a value that is greater than d1 and is beyond the BLE signal receivable range.

Referring to FIG. 3, when the mobile device 360 is located at a position P1, the distance between the mobile device 360 and the display apparatus 310 is d1 and is within the BLE signal receivable range. Thus, when a BLE signal is transmitted from the mobile device 360, the display apparatus 310 may receive the BLE signal transmitted from the mobile device 360 by scanning. Accordingly, the display apparatus 310 may continuously execute the ambient service or start the execution of the ambient service to display a screen (e.g., a clock screen or the like) corresponding to the ambient service on a display thereof.

Referring to FIG. 3, when the mobile device 360 is located at a position P2, the distance between the mobile device 360 and the display apparatus 310 is d2 and thus is beyond the BLE signal receivable range. Thus, when a BLE signal is transmitted from the mobile device 360, the display apparatus 310 cannot receive the BLE signal transmitted from the mobile device 360 by scanning. Accordingly, the display apparatus 310 may end the execution of the ambient service, may not start the execution of a predetermined application (e.g., the ambient application or the ambient service), or may end the predetermined application that is being executed.

Figure 4:
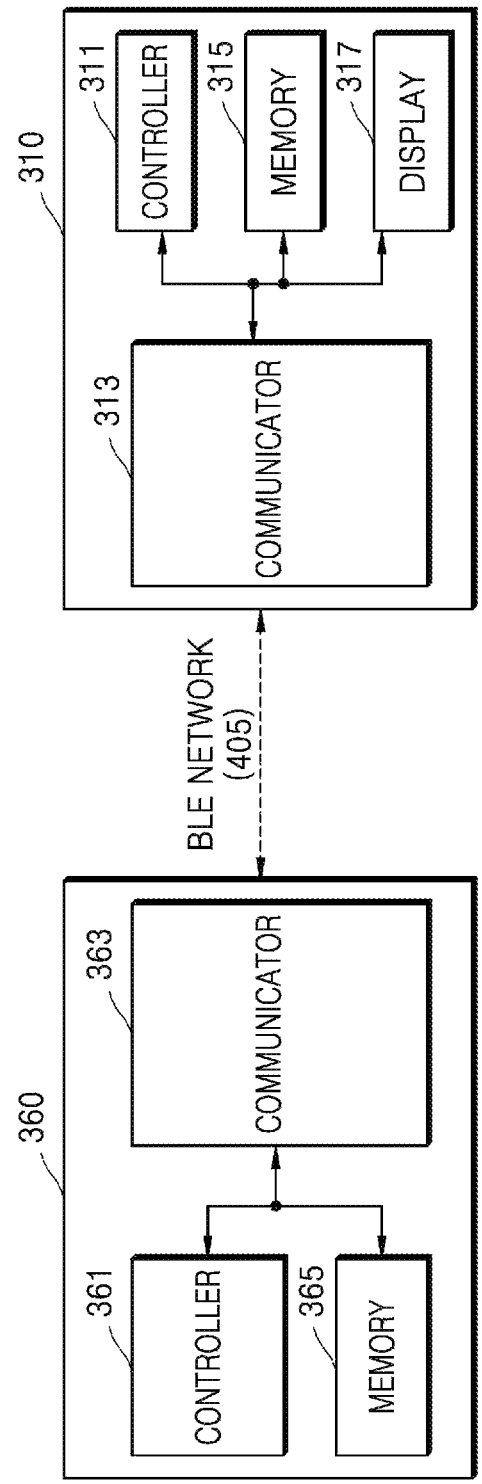
FIG. 4 is a block diagram illustrating an example display apparatus and an example mobile device according to an embodiment of the disclosure.

FIG. 4 is a block diagram illustrating an example display apparatus and mobile device according to an example embodiment of the disclosure. FIG. 4 is a block diagram illustrating a display apparatus capable of communicating with a mobile device via a BLE wireless network, according to an example embodiment of the disclosure. Components of FIG. 4 that are the same as those of FIG. 3 are illustrated using the same reference numerals.

Referring to FIG. 4, a display apparatus 310 according to an embodiment of the disclosure includes a controller (e.g., including processing circuitry) 311, a communicator (e.g., including communication circuitry) 313, a memory 315, and a display 317.

The display 317 may display a screen.

The memory 315 may store at least one instruction.

The communicator 313 may include various communication circuitry and communicate with a mobile device via at least one wireless network which includes, for example, and without limitation, the BLE network.

The controller 311 includes at least one processor (not shown) including various processing circuitry capable of executing at least one of the at least one instruction stored in the memory 315 to control the display apparatus 310. The at least one processor may control a process (such as a first process) to not be started in responding to a mobile device registered to control on or off control an predetermined application not being sensed when the predetermined application is executed. Herein the predetermined application may be an application for providing an ambient service. Accordingly, the predetermined application may be an ambient application.

And, the at least one processor may control the process (such as a first process) to not be started until the mobile device is sensed after the predetermined application is executed. For example, the controller 311 may control the process to be started in responding to the registered mobile device being sensed after the predetermined application is executed.

In detail, in responding to a mobile device (not shown) registered to control on or off of the ambient service not being sensed after a first point of time (e.g., t1 of FIG. 11) at which the ambient service is started, the at least one processor may control a first process, of automatically ending the ambient service, to not be started until the registered mobile device is sensed. In an embodiment of the disclosure, the controller 311 may control the first process to be performed when the registered mobile device is sensed for the first time after the first point of time t1 at which execution of the predetermined application (e.g., ambient application) is started. For example, the controller 311 may include starting the first process of automatically ending the ambient service when the registered mobile device is sensed at the start of the ambient service or when the registered mobile device is sensed by performing BLE scanning at certain time intervals.

The first process may be a process of determining whether to automatically end the ambient service according to a result of performing scanning to sense a registered mobile device.

For example, in the first process, whether to automatically end the ambient service may be determined according to the result of performing scanning to sense the registered mobile device at certain time intervals (e.g., at time intervals P2). For example, when the first process is started, BLE scanning may be performed at certain time intervals (e.g., the time intervals P2) to determine whether to automatically end the ambient service, based on whether the registered mobile device is sensed. For example, according to the first process, operations of ending the ambient service (e.g., outputting a user interface screen informing the end of the ambient service, and the like) are performed when the registered mobile device is not sensed by BLE scanning, and BLE scanning is performed again after a certain time interval (e.g., the time interval P2) while maintaining the ambient service, when the registered mobile device is sensed by BLE scanning.

For example, the first process may be a process of outputting a user interface screen for automatically ending the ambient service when the registered mobile device is not sensed as a result of performing scanning to sense the registered mobile device.

The display apparatus 310 may communicate with the mobile device 360 via at least one wireless network which may include, for example, the BLE network. The mobile device 360 may include a controller (e.g., including processing circuitry) 361, a communicator (e.g., including communication circuitry) 363, and a memory 365.

A configuration and operation of the mobile device 360 will be described in greater detail below.

The controller 361 may include at least one processor (not shown). Each of the at least one processor may include various processing circuitry and execute at least one instruction stored in the memory 365 to operate the display apparatus 310 to perform a certain operation under control of the at least one processor.

In an embodiment of the disclosure, the controller 361 may control a BLE signal to be transmitted. For example, the controller 361 may control the BLE signal to be transmitted in a different manner according to an operating system (OS) of the mobile device 360. A method of transmitting the BLE signal will be described in greater detail below with reference to FIGS. 9 and 10.

The communicator 363 may include at least one communication module (not shown) including various communication circuitry that may establish wireless communication with an external electronic device (e.g., the display apparatus 310 or the like) according to a certain wireless communication standard. For example, the communicator 363 may include a Bluetooth communication module (not shown) establishing wireless communication according to the BLE communication standard. The Bluetooth communication module may be a BLE module and is capable of transmitting or receiving a BLE signal.

In addition to the Bluetooth communication module, the communicator 363 may include a communication module may include various communication circuitry to establish a wireless communication according to a communication standard such as a wireless LAN or wired Ethernet. Here, the wireless LAN communication module (not shown) may include a Wi-Fi communication module (not shown) establishing wireless communication according to the Wi-Fi communication standard.

The communicator 363 may transmit a BLE signal under control of the controller 361.

The memory 365 may store at least one instruction to be executed by the controller 361. The memory 365 may further store other data.

In an embodiment of the disclosure, the mobile device 360 may transmit a BLE signal in response to a request from the display apparatus 310. The mobile device 360 may transmit a BLE signal at certain time intervals.

A configuration and operation of the display apparatus 310 according to an embodiment of the disclosure will be described in greater detail below.

The display 317 displays a screen under control of the controller 311. The screen corresponds to an image. An image output to a screen may be any type of data that is visually recognizable by a user. For example, the image may be a screen, e.g., a video such as broadcast content, a game, a photograph, a clock, or the like. Examples of a screen output during execution of the ambient service may include, for example, and without limitation, a famous painting, a photograph, a clock, a landscape screen, and the like.

The display 317 may display a screen corresponding to the ambient service during the execution of the ambient service. When the display 317 is turned off, a screen of the display 317 may turn black. When the display 317 is turned on, e.g., when the display apparatus 310 is in a normal mode, the display 317 may display a screen corresponding to certain content. When the ambient service is being executed after the display 317 is turned on, the display apparatus 310 may display a screen corresponding to the ambient service.

The memory 315 stores at least one instruction. The at least one stored in the memory 315 may be executed by a processor (not shown) included in the controller 311.

The memory 315 may include, for example, and without limitation, at least one type storage medium among a flash memory type storage medium, a hard disk type storage medium, a multimedia card micro type storage medium, a card type memory (e.g., SD or XD memory), a random access memory (RAM), a static RAM (SRAM), a read-only memory (ROM), an electrically erasable programmable ROM (EEPROM), a programmable ROM (PROM), a magnetic memory, a magnetic disk, an optical disk, or the like.

The controller 311 includes various processing circuitry, including, for example, at least one processor (not shown) capable of executing the at least one instruction stored in the memory 315. The at least one processor included in the controller 311 may execute the at least one instruction stored in the memory 315 to perform a certain operation and/or to control the display apparatus to perform certain operations. Each of the at least one processor may execute at least one of the at least one instruction stored in the controller 311 to perform a certain operation.

The at least one processor included in the controller 311 may control operations performed by the display apparatus 310 and control the other components of the display apparatus 310 to perform a certain operation. Thus, although a case in which performance of certain operations is controlled by the controller 311 is described above as an example, it will be apparent that the performance of the operations may be controlled by the at least one processor of the controller 311.

The controller 311 may further include an internal memory (not shown), and at least one processor (not shown) which executes stored at least one program. For example, the internal memory of the controller 311 may store one or more instructions. The at least one processor of the controller 311 may execute at least one of one or more instructions stored in the internal memory of the controller 311 to perform a certain operation.

The controller 311 may include a RAM (not shown) which stores a signal or data input from the outside of the display apparatus 310 or is used as a storage region corresponding to various operations performed by the display apparatus 310, a ROM (not shown) storing a control program for control of the display apparatus 310 and/or a plurality of instructions, and at least one processor (not shown). The at least one processor may include a graphic processing unit (not shown) to process graphics corresponding to video. The at least one processor may be embodied as a system-on-chip (SoC) which is a combination of a core (not shown) and a graphic processing unit (GPU) (not shown). The at least one processor may include a single core, dual cores, triple cores, quad cores, or multiple cores.

For convenience of explanation, a case in which in order to perform or control a certain operation by the controller 311, the at least one processor of the controller 311 executes the at least one instruction stored in the memory 315 to perform the operation will be described below an example.

The communicator 313 may include various communication circuitry and communicate with the mobile device 306 via at least one wireless network which includes, for example, a BLE network 405. For example, the communicator 313 may receive a BLE signal via the BLE network 405. An operation of receiving or scanning a BLE signal transmitted from the mobile device 360 will be described in greater detail below with reference to FIGS. 9 and 10.

In an embodiment of the disclosure, the controller 311 (particularly, the at least one processor included in the controller 311) may start the ambient service at a first point of time t1. The ambient service may, for example, be started according to a user's request or setting. For example, the controller 311 may start the ambient service according to a user input requesting to execute the ambient service, the user input being input through a remote controller (not shown). In a case that the ambient service is set to be executed when a user input requesting to turn off the display apparatus 310 is received, the controller 311 may start the ambient service in response to the user input requesting to turn off the display apparatus 310.

The controller 311 may determine whether a mobile device registered to control on or off of the ambient service is sensed after the first point of time t1 at which the ambient service is started. The "registered mobile device" may refer, for example, to a mobile device that has been registered legitimately with the display apparatus 310. The "registered mobile device" may refer, for example, to a mobile device having a history of being legitimately paired with the display apparatus 310 via a wireless network. An operation of registering a mobile device by the display apparatus 310 will be described in greater detail below with reference to FIG. 7.

For example, the display apparatus 310 may determine whether there is a registered mobile device, based on a BLE signal received via the BLE network 405. As described above with reference to FIG. 3, when a registered mobile device is located within a BLE identification range, the display apparatus 310 may sense the registered mobile device, based on a BLE signal transmitted from the registered mobile device. Searching for a BLE signal transmitted from a certain mobile device (e.g., a registered mobile device) by the display apparatus 310 to sense the mobile device may, for example, be referred to scanning or BLE scanning. When the registered mobile device is not located within the BLE identification range, the display apparatus 310 cannot sense the registered mobile device.

When the registered mobile device is not sensed after the first point of time t1, the controller 311 may control the first process to not be started until the registered mobile device is sensed. The first process includes operations for ending the ambient service. For example, the first process includes operations for ending the ambient service when the registered mobile device is not located near the display apparatus 310. For example, when the first process is started, the controller 311 may control a user interface screen or an audio notification message informing the end of the ambient service to be output, and may end the ambient service. The user interface screen that is output when the first process is started will be described in greater detail below with reference to FIGS. 14 and 15.

According to an embodiment of the disclosure, the display apparatus 310 may control the ambient service to be on until the registered mobile device is sensed after the point of time t1. An example in which the display apparatus 310 is disposed in a home as described above with reference to FIG. 1, both first and second members of the home are users of the display apparatus 310, the first member and a mobile device 151 of the first member (here, the mobile device 151 has been registered with the display apparatus 310) are not located within the BLE identification range, and the second member and a mobile device 152 of the second member are located within the BLE identification range will be described below as an example. In this example, although the mobile device 152 of the second member is not registered with the display apparatus 310, in case that the second member is watching an ambient screen 1101, the display apparatus 310 according to an embodiment of the disclosure may continuously execute the ambient service even when the registered mobile device 151 is not sensed. Thus, inconvenience caused to the second member when the ambient service is suddenly ended may be prevented and/or reduced, thereby increasing user satisfaction of the second member.

In an embodiment of the disclosure, while the ambient service is being used by a user (e.g., the second member) other than a user (e.g., the first member) of a registered mobile device, inconvenience which may be caused to the second member due to the end of the ambient service regardless of the second member's intention may be prevented and/or reduced, and thus, the ambient service may be provided in accordance with the user's intention.

Figure 5:
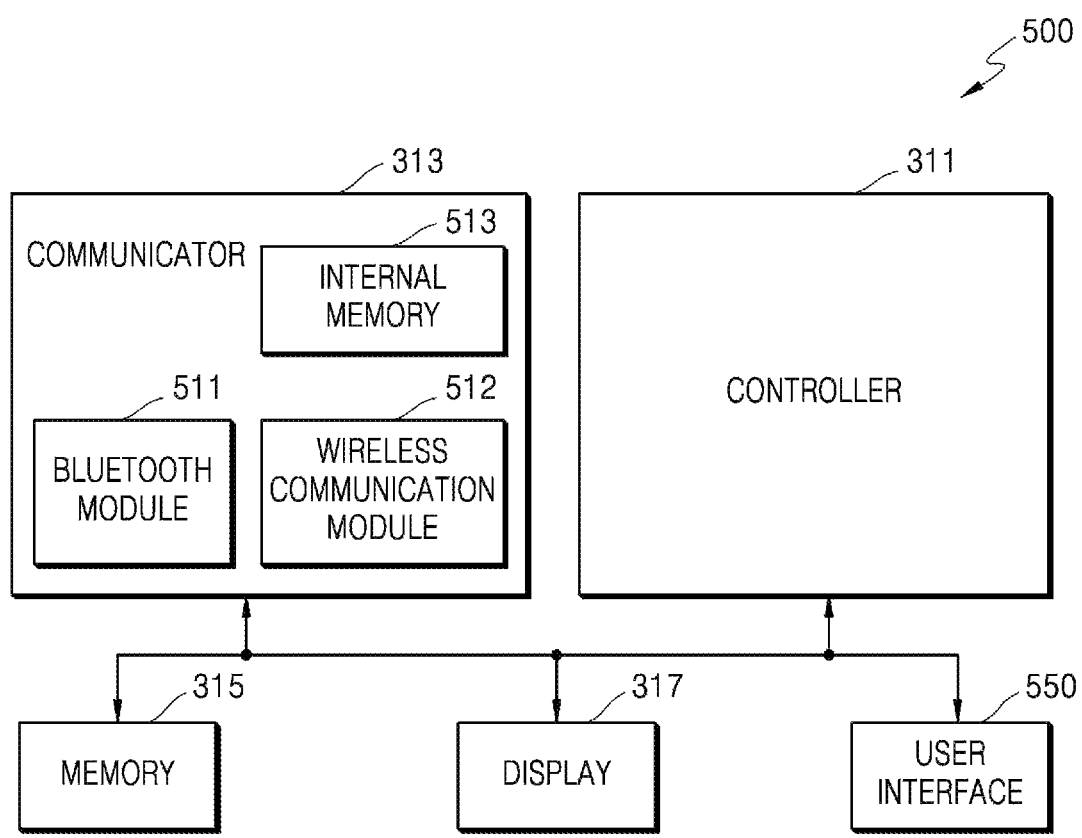
FIG. 5 is a block diagram illustrating an example display apparatus according to an embodiment of the disclosure.

FIG. 5 is a block diagram illustrating an example display apparatus according to an example embodiment of the disclosure. A display apparatus 500 of FIG. 5 may correspond to the display apparatus 310 of FIG. 4. Components of the display apparatus 500 of FIG. 5 that are the same as those of the display apparatus 310 of FIG. 4 are illustrated using the same reference numerals. Thus, a description of parts of the display apparatus 500 that are the same as those of FIG. 4 may not be repeated here.

Referring to FIG. 5, the display apparatus 500 includes a controller (e.g., including processing circuitry) 311, a communicator (e.g., including communication circuitry) 313, a memory 315, a display 317, and a user interface 550. The display apparatus 500 may communicate with the mobile device 360 via, for example, a BLE network (e.g., the BLE network 405 of FIG. 4).

The communicator 313 may include at least one communication module including various communication circuitry to establish wireless communication. For example, the at least one communication module included in the communicator 313 may include a Bluetooth module (e.g., including various Bluetooth communication circuitry) 511 and a wireless communication module (e.g., including various wireless communication circuitry) 512. The communicator 313 may further include an internal memory 513.

The Bluetooth module 511 may receive a Bluetooth signal transmitted from an external electronic device (not shown) according to the Bluetooth communication standard. The Bluetooth module 511 may, for example, be a BLE module and is capable of receiving a BLE signal.

The Bluetooth module 511 may scan a BLE signal continuously or temporarily to sense whether a BLE signal is received or not.

The communicator 313 may further include at least one wireless communication module (not shown) including various wireless communication circuitry to transmit and receive wireless signals other than a BLE signal. For example, the communicator 313 may include a wireless LAN module (not shown). The wireless LAN module may receive a Wi-Fi signal transmitted from an external electronic device (e.g., the mobile device 360) according to the Wi-Fi communication standard.

An example in which the communicator 313 is provided as a BLE module and receives a BLE signal will be described below by way of non-limiting example.

In an embodiment of the disclosure, the communicator 313 may include an internal memory 513 therein. The internal memory 513 may store information regarding a registered mobile device. For example, the internal memory 513 may store registered-mobile device identification information identifying the registered mobile device. The registered-mobile device identification information may include a Bluetooth MAC address or a BLE MAC address of the registered mobile device. For example, a BLE signal transmitted from the mobile device 360 may include identification information of the mobile device 360, for example, a BLE MAC address of the mobile device 360. The BLE signal may include information for obtaining the identification information of the mobile device 360. For example, the BLE signal may include a random address corresponding to the BLE MAC address of the mobile device 360. The random address may be information which is a basis for obtaining the BLE MAC address.

Upon receiving the BLE signal transmitted from the mobile device 360 via the Bluetooth module 511, the display apparatus 500 may determine the mobile device 360 transmitting the BLE signal as the registered mobile device when the identification information of the mobile device 360 corresponds to the registered-mobile device identification information stored in the internal memory 513.

The registered-mobile device identification information may be stored in another memory (e.g., the memory 315) included in the display apparatus 500 other than the internal memory 513.

As described above, the display apparatus 500 may sense the registered mobile device by determining whether the mobile device 360 transmitting the BLE signal is the registered mobile device, based on the registered-mobile device identification information stored in the internal memory 513 and the received BLE signal. The controller 311 may control the ambient service to be on until the registered mobile device is sensed after the first point of time t1 at which the ambient service is started. For example, when the registered mobile device is not sensed after the first point of time, the controller 311 prevents the first process, of performing the operations for ending the ambient service, from being started. Thus, in an embodiment of the disclosure, the controller 311 may control the ambient service to be maintained when the registered mobile device is not sensed after the first time of point.

The user interface 550 may receive a user input for controlling the display apparatus 500. The user interface 550 may include, but is not limited to, a touch panel that senses a user's touch, a button that receives a push operation from a user, a wheel that receives a rotation operation from a user, a key board, a dome switch, and the like.

In an embodiment of the disclosure, when a user interface screen (not shown) for pairing with the mobile device 360 and/or registering the mobile device 360 is output under control of the controller 311, data and/or a request for registering the mobile device 360 may be input by a user. The controller 311 may perform pairing with and/or registering the mobile device 360, based on the input from the user.

When a user interface screen (not shown) for starting or ending the ambient service is output under control of the controller 311, a request to start or end the ambient service may be input by the user via the user interface 550.

Figure 6:
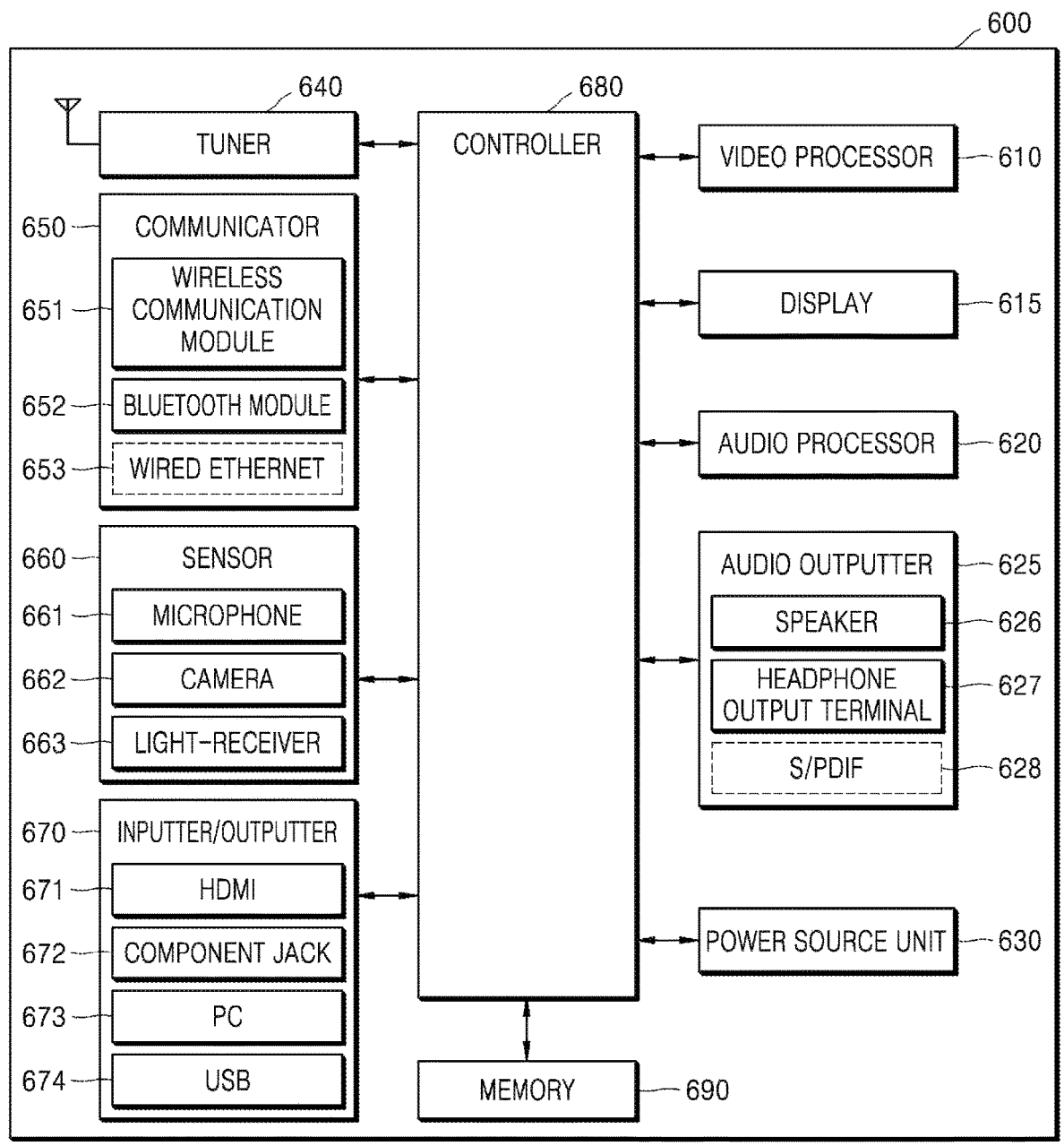
FIG. 6 is a block diagram illustrating an example display apparatus according to another embodiment of the disclosure.

FIG. 6 is a block diagram illustrating an example display apparatus according to another example embodiment of the disclosure.

A display apparatus 600 according to an embodiment of the disclosure may correspond to the display apparatus 310 or 500 described above with reference to FIGS. 1 to 5. Thus, a description of parts of the display apparatus 600 that are the same as those of FIGS. 1 to 5 may not be repeated here. The display apparatus 600 may be a display apparatus capable of receiving a BLE signal which is a radio signal.

Referring to FIG. 6, the display apparatus 600 includes a video processor (e.g., including video processing circuitry) 610, a display 615, an audio processor (e.g., including audio processing circuitry) 620, an audio outputter (e.g., including audio output circuitry) 625, a power source unit (e.g., including a power supply) 630, a tuner 640, a communicator (e.g., including communication circuitry) 650, a sensor 660, an inputter/outputter (e.g., including input/output circuitry) 670, a controller (e.g., including processing circuitry) 680, and a memory 690.

The controller 680 may correspond to the controller 311 of the display apparatus 500 of FIG. 5. The communicator 313, the Bluetooth module 511, the wireless communication module 512, the display 317, and the memory 315 of FIG. 5 may respectively correspond to the communicator 650, a Bluetooth module 652, a wireless communication module 651, the display 615, and the memory 690 of the display apparatus 600 of FIG. 6. Therefore, a description of parts of the display apparatus 600 of FIG. 6 that are the same as those of the display apparatus 500 may not be repeated here.

The video processor 610 may include various video processing circuitry and processes video data received by the display apparatus 600. The video processor 610 may perform various image processing, such as, for example, and without limitation, decoding, scaling, noise filtering, frame rate conversion, resolution conversion, and the like, on the video data.

The controller 680 may include various processing circuitry and receive a request to record the video data processed by the video processor 610, encrypt the video data, and control the encrypted video data to be recorded on either the memory 690 or a memory device (not shown), e.g., a RAM, included in the controller 680.

The display 615 may display on a screen a video included in a broadcast signal received via the tuner 640, under control of the controller 680. The display 615 may display content (e.g., a moving image) input via the communicator 650 or the inputter/outputter 670.

The display 615 may output an image stored in the memory 690 under control of the controller 680. In addition, the display 615 may display, for example, a voice user interface (UI) (including, for example, a voice instruction guide) to perform a voice recognition task corresponding to voice recognition or a motion UI (including, for example, a user motion guide for motion recognition) to perform a motion recognition task corresponding to motion recognition.

The audio processor 620 may include various audio processing circuitry and processes audio data. The audio processor 620 may perform various audio processing, such as, for example, and without limitation, decoding, amplification, noise filtering, and the like, on the audio data. The audio processor 620 may include a plurality of audio processing modules to process audio signals corresponding to a plurality of pieces of content.

The audio outputter 625 may include various audio outputting circuitry and outputs an audio signal included in a broadcast signal received via the tuner 640, under control of the controller 680. The audio outputter 625 may output an audio signal (e.g., voice or sound) input via the communicator 650 or the inputter/outputter 670. The audio outputter 625 may output audio data stored in the memory 690 under control of the controller 680. The audio outputter 625 may include, for example, and without limitation, at least one of a speaker 626, a headphone output terminal 627, a Sony/Philips Digital Interface (S/PDIF) output terminal 628, or the like. The audio outputter 625 may include, for example, a combination of the speaker 626, the headphone output terminal 627 and the S/PDIF output terminal 628.

The power source unit 630 may include a power supply that supplies power from an external power source to the internal components 610 to 690 of the display apparatus 600, under control of the controller 680. The power supply unit 630 may supply power output from one or more batteries (not shown) included in the display apparatus 600 to the internal components 610 to 690, under control of the controller 680.

The tuner 640 may select only a frequency of a channel to be received by the display apparatus 600 among various radio wave components by tuning only the frequency of the channel by performing amplification, mixing, or resonance on a broadcast signal received via wire or wirelessly. The broadcast signal includes audio data, video and additional information (e.g., an electronic program guide (EPG)).

The tuner 640 may receive a broadcast signal in a frequency band corresponding to a channel number (e.g., cable broadcast channel No. 506) according to a control signal, such as a channel number input, a channel up-down input, or a channel input via an EPG screen, which is received from a user input (e.g., an external control device (not shown) or a remote controller (not shown).

The tuner 640 may receive broadcast signals from various sources such as terrestrial broadcasting, cable broadcasting, satellite broadcasting, Internet broadcasting, and the like. The tuner 640 may receive a broadcast signal from a source such as analog broadcasting or digital broadcasting. Decoding (for example, audio decoding, video decoding, or supplementary information decoding) is performed on the broadcast signal received via the tuner 640 to divide the broadcast signal into audio data, video and/or additional information. The audio data, the video and/or the additional information may be stored in the memory 690 under control of the controller 680.

The display apparatus device 600 may be provided with one or more tuners 640. According to an embodiment of the disclosure, when a plurality of tuners 640 are provided, a plurality of broadcast signals may be output to a plurality of windows constituting a multi-window screen provided on the display 615.

The tuner 640 may be embodied as an all-in-one device together with the display apparatus 600, or may be embodied as either a separate device (e.g., a set-top box (not shown)) with a tuner electrically connected to the display apparatus 600 or a tuner (not shown) connected to the inputter/outputter 670.

The communicator 650 may include various communication circuitry that may be included in various communication modules and connect the display apparatus 600 to an external device (e.g., an audio device) under control of the controller 680. The controller 680 may transmit content to or receive content from an external device connected thereto via the communicator 650, may download an application from the external device, or may perform web browsing. In detail, the communicator 650 may be connected to a network to receive content from an external device (not shown).

As described above, the communicator 650 may include various communication circuitry included, for example, and without limitation, in at least one of a short-range communication module (not shown), a wired communication module (not shown), or a mobile communication module (not shown).

FIG. 6 illustrates an example in which the communicator 650 includes one of the wireless communication module 651, the Bluetooth module 652, and a wired Ethernet module 153.

The communicator 650 may include a combination of the wireless communication module 651, the Bluetooth module 652, and the wired Ethernet module 153. The communicator 650 may receive a control signal from a control device (not shown) under control of the controller 680. The control signal may be embodied as a Bluetooth type, an RF signal type, or a WiFi type.

In an embodiment of the disclosure, the Bluetooth module 652 may transmit or receive a BLE signal conforming to the BLE communication standard.

The communicator 650 may further include a short-range communication module (e.g., a near-field communication (NFC) module) (not shown) and a separate BLE module (not shown), as well as the Bluetooth module 651.

The sensor 660 may include various sensors and may sense, for example, and without limitation, a user's voice, image, interaction, or the like.

A microphone 661 receives the user's uttered voice. The microphone 661 may convert received voice into an electric signal and output the electric signal to the controller 680. The user's voice may include, for example, voice corresponding to a menu or function of the display apparatus 600. For example, it is desirable that a recognition range of the microphone 661 be four meters or less from the microphone 661 to the user's position. The recognition range of the microphone 661 may vary according to the volume of the user's voice and a surrounding environment (e.g., sound of a speaker or ambient noise).

The microphone 661 may be formed integrally with or separately from the display apparatus 600. The microphone 661, when formed separately from the display apparatus 600, may be electrically connected to the display apparatus 600 via the communicator 650 or the inputter/outputter 670.

It will be readily understood by those of ordinary skill in the art that the microphone 661 may be omitted depending on the performance and structure of the display apparatus 600.

A camera 662 may receive an image (e.g., continuous frames) corresponding to a user's motion, including a gesture, made within a recognition range of the camera 662. For example, the recognition range of the camera 662 is a distance to the user from the camera 662 and may range from 0 to 1 to 5 meters. The user's motion may include, for example, a motion made by the user's body part or part, such as the user's face, facial expression, hand, fist, or finger. The camera 662 may convert a received image into an electric signal and output the electric signal to the controller 680, under control of the controller 680.

The controller 680 may select a menu displayed on the display apparatus 600 using a result of recognition of a received motion or may perform control corresponding to the result of recognition of the motion. For example, the control may include channel control, volume control, and indicator movement.

The camera 662 may include a lens (not shown) and an image sensor (not shown). The camera 662 may support optical zoom or digital zoom using a plurality of lenses and image processing. The recognition range of the camera 662 may be variously set according to the angle of the camera 662 and surrounding conditions. When the camera 662 includes a plurality of cameras, a three-dimensional (3D) still image or a 3D motion may be received via the cameras.

The camera 662 may be formed integrally with or separately from the display apparatus 600. A separate device (not shown) having the separated camera 662 formed separately from the display apparatus 600 may be electrically connected to the display apparatus 600 via the communicator 650 or the inputter/outputter 670.

It will be readily understood by those of ordinary skill in the art that the camera 662 may be omitted depending on the performance and structure of the display apparatus 600.

A light-receiver 663 may include various light-receiving circuitry and receive an optical signal (including a control signal) received from an external control device (not shown) via an optical window (not shown) of a bezel of the display 615 or the like. The light-receiver 663 may receive an optical signal corresponding to a user input (e.g., touching, pressing, a touch gesture, voice, or a motion) from a control device (not shown). The control signal may be extracted from the received optical signal under control of the controller 680.

For example, the light-receiver 663 may receive a signal corresponding to a pointing position of a control device (not shown) and transmit the signal to the controller 680. For example, in case that a user interface screen for receiving data or a command from a user via the display 615 is output and a user wants to input data or a command to the display apparatus 600 via a control device (not shown), the light-receiver 663 may receive a signal corresponding to a movement of the control device and transmit the signal to the controller 680 when the user moves the control device while touching a touch pad (not shown) of the control device with his or her finger. The light-receiver 663 may receive a signal indicating that a button of a control device (not shown) has been pressed, and may transmit the signal to the controller 680. For example, when the user presses a button type touch pad (not shown) of a control device (not shown), the light-receiver 663 may receive a signal indicating the pressing of the button-type touch pad to the controller 680. For example, the signal indicating the pressing of the button-type touch pad may be used as a signal for selecting one of items.

The inputter/outputter 670 may include various input/output circuitry and receives a video (e.g., a moving picture), an audio signal (e.g., voice or music), and additional information (e.g., an EPG), under control of the controller 680. The inputter/outputter 670 may include one of a high-definition multimedia interface (HDMI) port 671, a component jack 672, a PC port 673, and a USB port 674. The inputter/outputter 670 may include a combination of the HDMI port 671, the component jack 672, the PC port 673, and the USB port 674.

It will be easily understood by those of ordinary skill in the art that the configuration and operation of the inputter/outputter 670 may be variously implemented according to an embodiment of the disclosure.

The controller 680 controls overall operations of the display apparatus 600 and the flow of signals between the internal components of the display apparatus 600, and performs data processing. The controller 680 may execute an OS and various applications stored in the memory 690 when a user input is given or a stored predetermined condition is satisfied.

The controller 680 may include a RAM (not shown) which stores a signal or data input from the outside of the display apparatus 600 or is used as a storage region corresponding to various operations performed by the display apparatus 600, a ROM (not shown) storing a control program for control of the display apparatus 600, and a processor (not shown).

The processor may include a GPU (not shown) to process graphics corresponding to video. The processor may be embodied as a SoC which is a combination of a core (not shown) and a GPU (not shown). The processor may include a single core, dual cores, triple cores, quad cores, or multiple cores.

The processor may include a plurality of processors. For example, the processor may be embodied as including a main processor (not shown), and a sub-processor (not shown) operating in a sleep mode.

The GPU may generate a screen including various objects, such as an icon, an image, and text, using an operation unit (not shown) and a renderer (not shown). The operation unit calculates attribute values, such as coordinates, a shape, a size, and color, of each object to be displayed according to a layout of a screen, through a user interaction sensed via the sensor 660. The renderer generates screens of various layouts including objects, based on the attribute values calculated by the operation unit. The screen generated by the renderer is displayed on a display region of the display 615.

Figure 7:
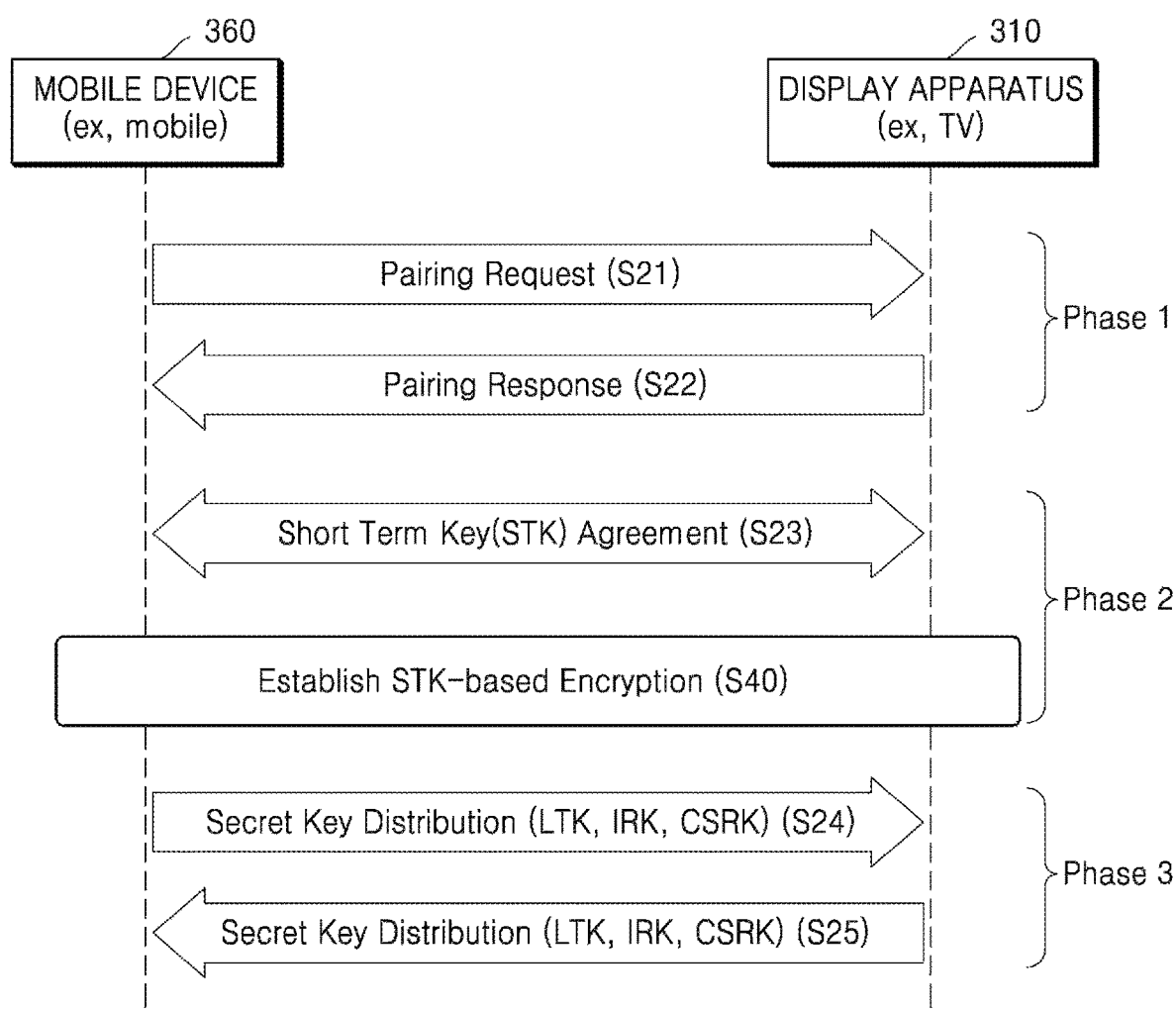
FIG. 7 is a signal flow diagram illustrating an example pairing operation performed between a display apparatus and a mobile device, according to an embodiment of the disclosure.

FIG. 7 is a signal flow diagram illustrating an example pairing operation performed between a display apparatus and a mobile device according to an embodiment of the disclosure. In FIG. 7, a mobile device 360 and a display apparatus 310 may correspond, for example, to the mobile device 360 and the display apparatus 310 described above with reference to FIG. 3, and components thereof that are the same as or similar to those of the mobile device 360 and the display apparatus 310 of FIG. 3 are assigned the same reference numerals. Thus, a description of parts of FIG. 7 that are the same as those of FIG. 3 may not be repeated here. The display apparatus 310 illustrated in FIG. 7 may correspond to the display apparatus 310 described above with reference to FIG. 5.

The display apparatus 310 may perform pairing for registration of the mobile device 360. For example, the display apparatus 310 may perform BLE pairing for registration of the mobile device 360.

BLE pairing may, for example, be divided into a request operation (phase 1) (S21 and S22), a key agreement operation (phase 2) (S23), and a key exchange operation (phase 3) (S24 and S25).

In a first operation of BLE pairing (phase 1), a pairing request and a paring response are made. For example, the mobile device 360 may transmit a signal requesting pairing to the display apparatus 310 (S21), and the display apparatus 310 may transmit a response permitting pairing to the mobile device 360 in response to the request (S22).

A second operation of BLE pairing (phase 2) may, for example, be an operation of creating a secure channel to maintain security. For example, in phase 2, a short term key (STK) may be generated between the mobile device 360 and the display apparatus 310 to generate a secure channel to be temporarily used.

In the following third operation of BLE pairing (phase 3), security keys to be used for BLE pairing may be shared. For example, after BLE pairing is performed, an identity resolving key (IRK) may be exchanged to be used to convert a random address transmitted from the mobile device 360 into a 'BLE address' which is an original address that was transmitted during BLE pairing. In detail, BLE pairing is completed when keys (a long-term key (LTK), the IRK, and a connection signature resolving key (CSRK)) for actual BLE pairing are shared. Here, information transmitted during BLE pairing, e.g., the BLE address, the keys (the LTK, the IRK, and the CSRK) and the like, may be stored in the memory 513 of the communicator 313 of FIG. 5. The "random address" may be included in a BLE signal transmitted from the mobile device 360. The "BLE address" may be a BLE MAC address as described above.

For example, in phase 1, when the mobile device 360 transmits a signal requesting pairing to the display apparatus 310 (S21), the mobile device 360 may transmit the "BLE address" identifying a device that transmits a BLE signal to the display apparatus 310. The BLE address may include a unique value for identifying the mobile device 360 so that the origin of the mobile device 360 transmitting the BLE signal may be identified. For example, the BLE address may be information identifying the mobile device 360 connected to the display apparatus 310 via a BLE communication network. For example, the BLE address may include a BLE MAC address of the mobile device 360. Accordingly, a case in which "BLE identification information" is a BLE MAC address will be described below as an example.

The pairing operation of FIG. 7 is an operation according to the Bluetooth (BT) communication standard. A pairing method other than that described above with reference to FIG. 7 may be used for pairing between the mobile device 360 and the display apparatus 310.

For pairing between two devices, the two devices share information thereof with each other. At this time, the mobile device 360 may transmit information regarding an operating system (OS) type thereof (e.g., Android, iOS, or the like) to the display apparatus 310.

When the pairing operation is completed, the display apparatus 310 may identify the mobile device 360 as a registered mobile device.

In an embodiment of the disclosure, the display apparatus 310 which is a receiving end may store identification information (e.g., the BLE address) of the mobile device 360 during BLE pairing, so that the identification information may be used to identify a BLE signal (e.g., a BLE packet) that is transmitted subsequently and includes a random address. That is, the display apparatus 310 may scan a BLE signal received subsequently, based on the identification information of the mobile device 360 stored as the pairing operation is completed, and determine whether the mobile device 360 transmitting the BLE signal is a registered mobile device, based on the scanned BLE signal.

Figure 8:
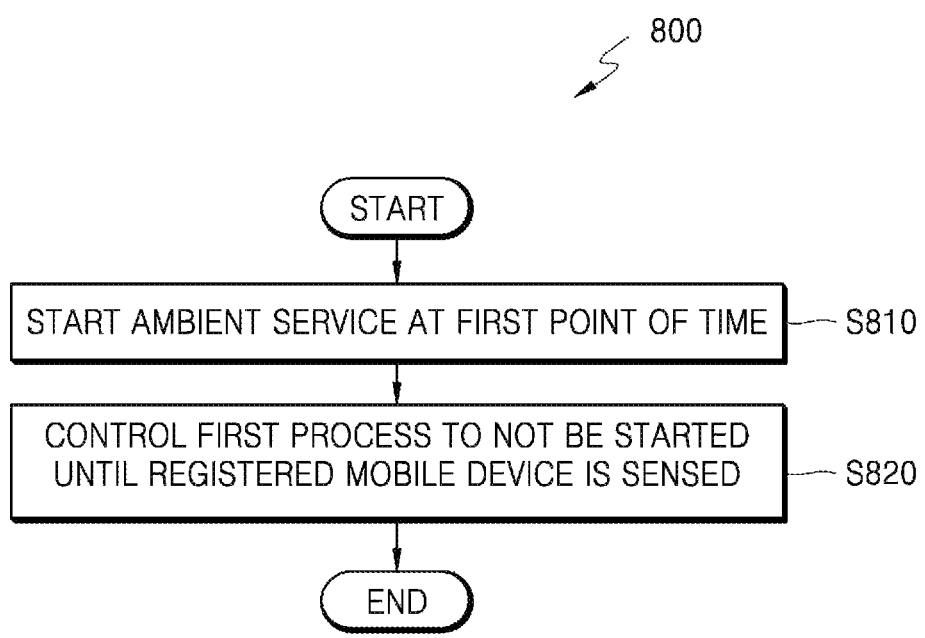
FIG. 8 is a flowchart illustrating an example control method of a display apparatus, according to an embodiment of the disclosure.

FIG. 8 is a flowchart illustrating an example control method 800 of a display apparatus according to an example embodiment of the disclosure. The flowchart of the control method 800 of a display apparatus illustrated in FIG. 8 may correspond, for example, to the operations performed by the display apparatus 310, 500, or 600 according to the various example embodiments of the disclosure described above with reference to FIGS. 1 to 7. Thus, operations included in the control method 800 of a display apparatus may correspond to the operations performed by the display apparatus 310, 500, or 600 described above with reference to FIGS. 1 to 7. Accordingly, a description of parts of the control method 800 of a display apparatus that are the same as those of FIGS. 1 to 7 may not be repeated here.

An example in which the control method 800 of a display apparatus is performed by the display apparatus 310 of FIG. 3 will be described below as an example.

The control method 800 of a display apparatus may, for example, be a control method of the display apparatus 310 capable of providing predetermined application (e.g.; ambient service or ambient application).

In the control method 800 of the display apparatus 310, an execution of the predetermined application (e.g, ambient application) is started. For example, in the control method 800 of the display apparatus 310, the ambient service is started at a first point of time t1 (S810). Operation S810 may be performed under control of the controller 311 of the display apparatus 310. For example, the controller 311 (particularly, a processor (not shown) of the controller 311) may control the display apparatus 310 to start the ambient service at the first point of time t1.

In the control method 800 of the display apparatus 310, a process is controlled to not be started until the registered mobile device is sensed. For example, in the control method 800 of the display apparatus 310, a first process is controlled to not be started until the registered mobile device is sensed after the first point of time t1 (S820). Operation S820 may be performed under control of the controller 311 of the display apparatus 310. For example, the controller 311 may perform BLE scanning. Thereafter, the first process of automatically ending the ambient service may be controlled to not be started until the registered mobile device is sensed by BLE scanning.

The display apparatus 310 may control the start and/or end of the ambient service, based on a BLE signal transmitted from a mobile device registered with the display apparatus 310. For example, the display apparatus 310 may control the start and/or end of the ambient service, based on a BLE signal sensed within a BLE signal identification range of the display apparatus 310.

Referring to FIG. 1, the display apparatus 160 is often used in a home and there may be a plurality of members in the home. For example, users of the display apparatus 160 may be a plurality of members in the home. It is assumed that a first member in the home owns the mobile device 151 and a second member in the home owns the mobile device 152. It is also assumed that only the mobile device 151 has been registered with the display apparatus 160 and the mobile device 152 is not registered.

When the ambient service is started, the display apparatus 160 displays an ambient screen. The display apparatus 160 may perform BLE scanning at certain time intervals to determine whether there is a registered mobile device. A general display apparatus may end the ambient service when a result of performing BLE scanning reveals that a registered mobile device is not located near the general display apparatus (for example, a space within the BLE identification range of the general display apparatus). The general display apparatus may maintain the ambient service when the result of performing BLE scanning reveals that the registered mobile device is located near the general display apparatus (in detail, the space within the BLE identification range of the general display apparatus).

In the above example, only the mobile device 151 is a registered mobile device, and thus, even in case that the mobile device 152 is located in the space within the BLE identification range, the general display apparatus ends the ambient service when the mobile device 151 which is the registered mobile device is not located near the general display apparatus. That the mobile device 152 is located in the space within the BLE identification range may be understood to refer, for example, to the second member in the home who is the user of the mobile device 152 being located in the space within the BLE identification range. For example, even when the second member in the home is located in the space within the BLE identification range and is watching the ambient screen, the general display apparatus determines that the mobile device 151 which is the registered mobile device does not exist and thus ends the ambient service. In this example, the second member in the home who is watching the ambient service cannot view the ambient screen regardless of his or her intention. Therefore, the second member in the home may feel uncomfortable.

In an embodiment of the disclosure, the first process for automatically ending the ambient service is controlled to not be started until a registered mobile device is sensed so as to overcome the above-described problem and control the execution of the ambient service in accordance with an intention of a user of a display apparatus. Accordingly, it is possible to enhance user convenience for a plurality of users of the display apparatus.

The control method of a display apparatus and the display apparatus thereof according to the embodiments of the disclosure described above with reference to FIGS. 1 to 8 are capable of maintaining the ambient service without ending execution of the ambient service even when a registered user is not located near the display apparatus. Accordingly, users other than the registered user may be provided with the ambient service to increase the users' satisfaction.

Operations of enhancing user convenience according to an embodiment of the disclosure will be described in greater detail below with reference to FIGS. 9 to 15.

Figure 9:
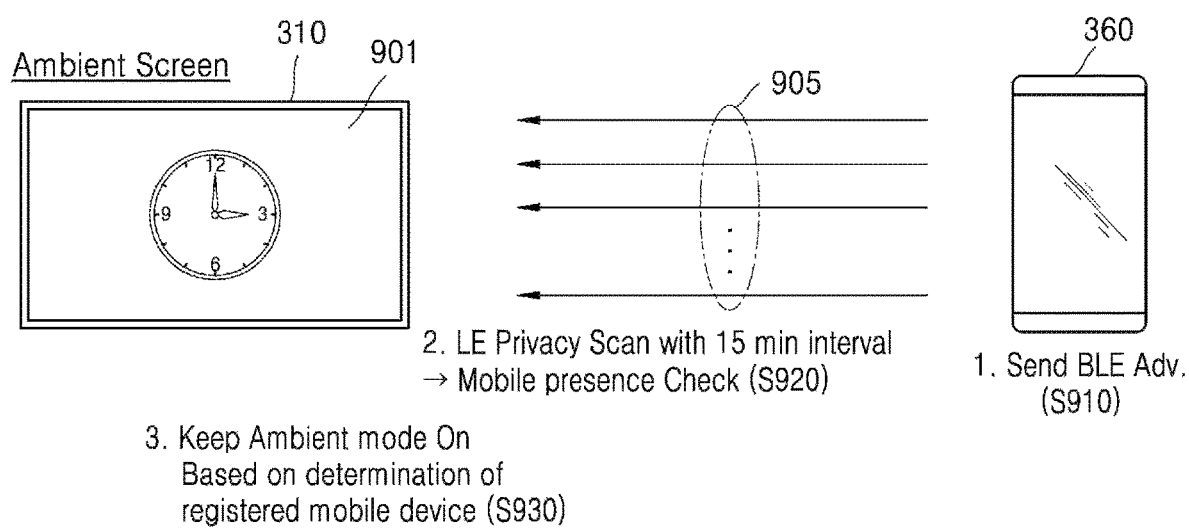
FIG. 9 is a diagram illustrating an example operation of an ambient service executed by a display apparatus paired with a mobile device having a first operating system according to an embodiment of the disclosure.

FIG. 9 is a diagram illustrating an example operation of an example ambient service executed by a display apparatus paired with a mobile device having a first operating system. For example, BLE scanning performed to identify the mobile device having the first operating system, e.g., an Android operating system, will be described by way of non-limiting example below.

FIG. 9 illustrates an example of execution of the ambient service by a display apparatus 310. For example, the display apparatus 310 may start the ambient service at a first point of time t1. Accordingly, the display apparatus 310 may output a clock screen which may, for example, be an ambient screen to a display screen 901.

Referring to FIG. 9, a mobile device 360 having the Android operating system transmits a BLE advertisement 905 at certain time intervals (S910). For example, the mobile device 360 may transmit the BLE advertisement 905 at 1-second intervals. The mobile device 360 operating based on the Android operating system is capable of continuously transmitting a BLE advertisement. In this example, the BLE advertisement may be transmitted once a second, in consideration of a battery lifetime of the mobile device 360.

The display apparatus 310 may scan or check whether a BLE signal or a BLE packet is received at certain time intervals (S920). The scanning or checking of whether a BLE signal or a BLE packet is received may be referred to as "BLE scanning". For example, the display apparatus 310 may scan or check whether a BLE signal or a BLE packet is received at 15-minute intervals. The display apparatus 310 may perform scanning or checking for one minute at 15-minute intervals. For example, the display apparatus 310 may perform BLE scanning for one minute from a point of time t1 and then perform BLE scanning again for one minute after fifteen minutes from the point of time t1. Operation S920 may be performed by checking reception of a BLE signal or a BLE packet by the communicator 313. However, it will be understood that any time intervals may be used and that the disclosure is not limited to the examples set forth herein.

The display apparatus 310 may determine whether the mobile device 360 transmitting a BLE packet is a mobile device registered with the display apparatus 310, based on the BLE packet, and maintain execution of the ambient service, based on a result of the determination (S930). The BLE packet may include a presence section and identification information of the mobile device 360, and for example, a random address of the mobile device 360, may be included in the presence section. The display apparatus 310 may convert a random address received using an identity resolving key (IRK) obtained during BLE pairing into a 'BLE address' which is an original address transmitted during BLE pairing. Thereafter, whether the mobile device 360 has been registered may be determined using the BLE address. Here, the BLE address may be a BLE MAC address.

Operations S920 and S930 may be performed under control of the controller 311, and for example, a processor (not shown) included in the controller 311.

As described above, the display apparatus 310 may perform BLE scanning at a desired point of time, e.g., for a certain time period at 15-minute intervals, to check whether there is a registered mobile device near the display apparatus 310.

When a registered mobile device is located near the display apparatus 310, it is determined that the presence of a user is identified and thus a screen is kept turned on. In other words, the display apparatus 310 maintains the ambient service (S930), and the ambient screen 901 is continuously output accordingly. Furthermore, the display apparatus 310 may perform BLE scanning again after a time interval (e.g., after 15 minutes) to determine whether to maintain the ambient screen 901.

Figure 10:
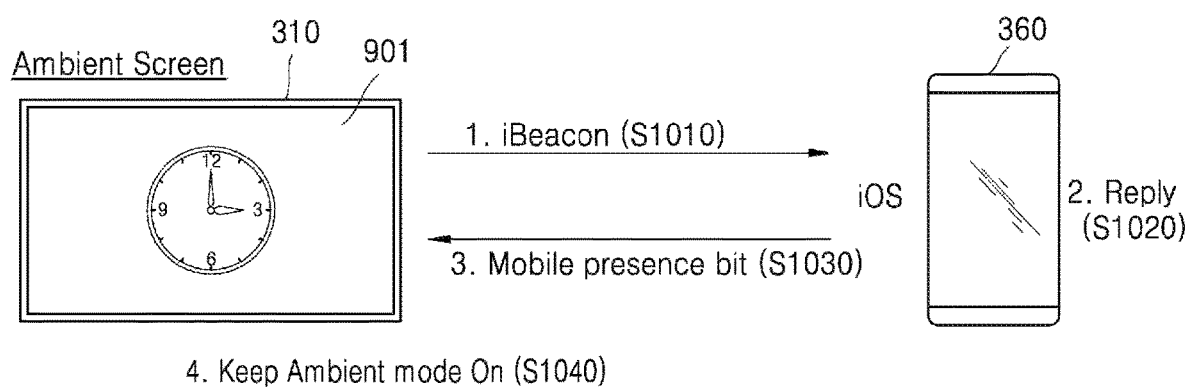
FIG. 10 is a diagram illustrating an example operation of an ambient service executed by a display apparatus paired with a mobile device having a second operating system different from the first operating system according to an embodiment of the disclosure.

FIG. 10 is a diagram illustrating an example operation of an ambient service executed by a display apparatus paired with a mobile device having a second operating system different from the first operating system according to an example embodiment of the disclosure. The second operating system may, for example, be an iOS operating system. A BLE signal received or transmitted by the mobile device 360 having the iOS operating system may, for example, be an iBeacon.

When a registered mobile device has the iOS operating system, the controller 311 may transmit to the mobile device 360 a first iBeacon signal requesting to transmit the identification information of the mobile device 360 at certain time intervals (S1010).

When receiving the first iBeacon transmitted from the display apparatus 310, the mobile device 360 may transmit an iBeacon including the identification information of the mobile device 360 to the display apparatus 310, in response to the first iBeacon (S1020 and 1030).

For example, the mobile device 360 having the iOS operating system may be triggered by the reception of the first iBeacon transmitted from the display apparatus 310 and thus transmit a second iBeacon including the identification information of the mobile device 360 to the display apparatus 310 (S1020 and S1030). Here, the identification information of the mobile device 360 may include a BLE MAC address or a random address, which is BLE identification information.

The display apparatus 310 may control the communicator 313 to check whether the second iBeacon signal including the identification information of the mobile device 360 is received. Accordingly, the display apparatus 310 may determine whether or not a registered mobile device is located close thereto. A subsequent operation (e.g., maintaining the execution of the ambient service (S1040)) to be performed when the registered mobile device is located close to the display apparatus 310 is the same as operation S930 of FIG. 9.

A time interval at which the display apparatus 310 transmits the first iBeacon to the mobile device 360 may be variously determined. For example, the display apparatus 310 may transmit an iBeacon to the mobile device 360 at intervals of 150 ms, and when the mobile device 360 transmits a response, the display apparatus 310 may check whether the response has arrived at intervals of 3 seconds.

As described above with reference to FIGS. 9 and 10, the display apparatus 310 may perform BLE scanning to sense a BLE signal received from the mobile device 360 to determine whether a registered mobile device is sensed. Thus, the performance of BLE scanning may correspond to determining whether a registered mobile device is sensed.

Figure 11:
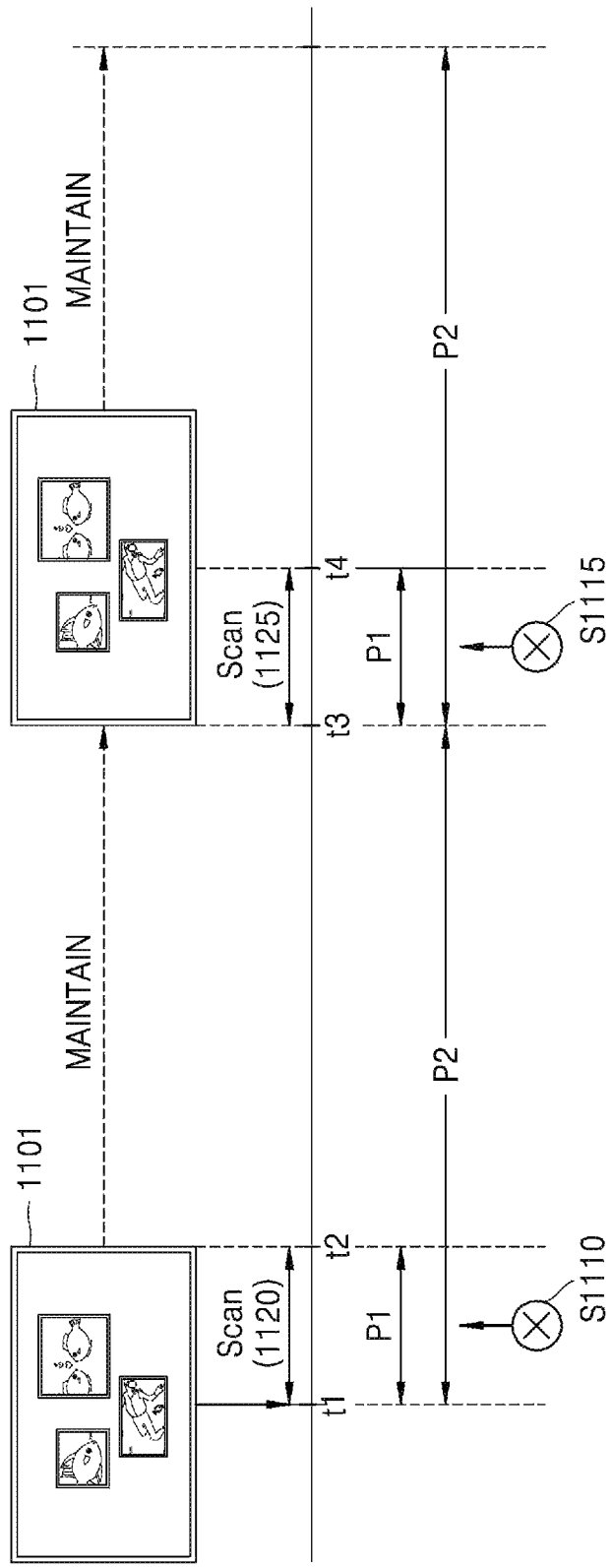
FIG. 11 is a diagram illustrating an example control operation of an ambient service, performed by a display apparatus, according to an embodiment of the disclosure.
Figure 12:
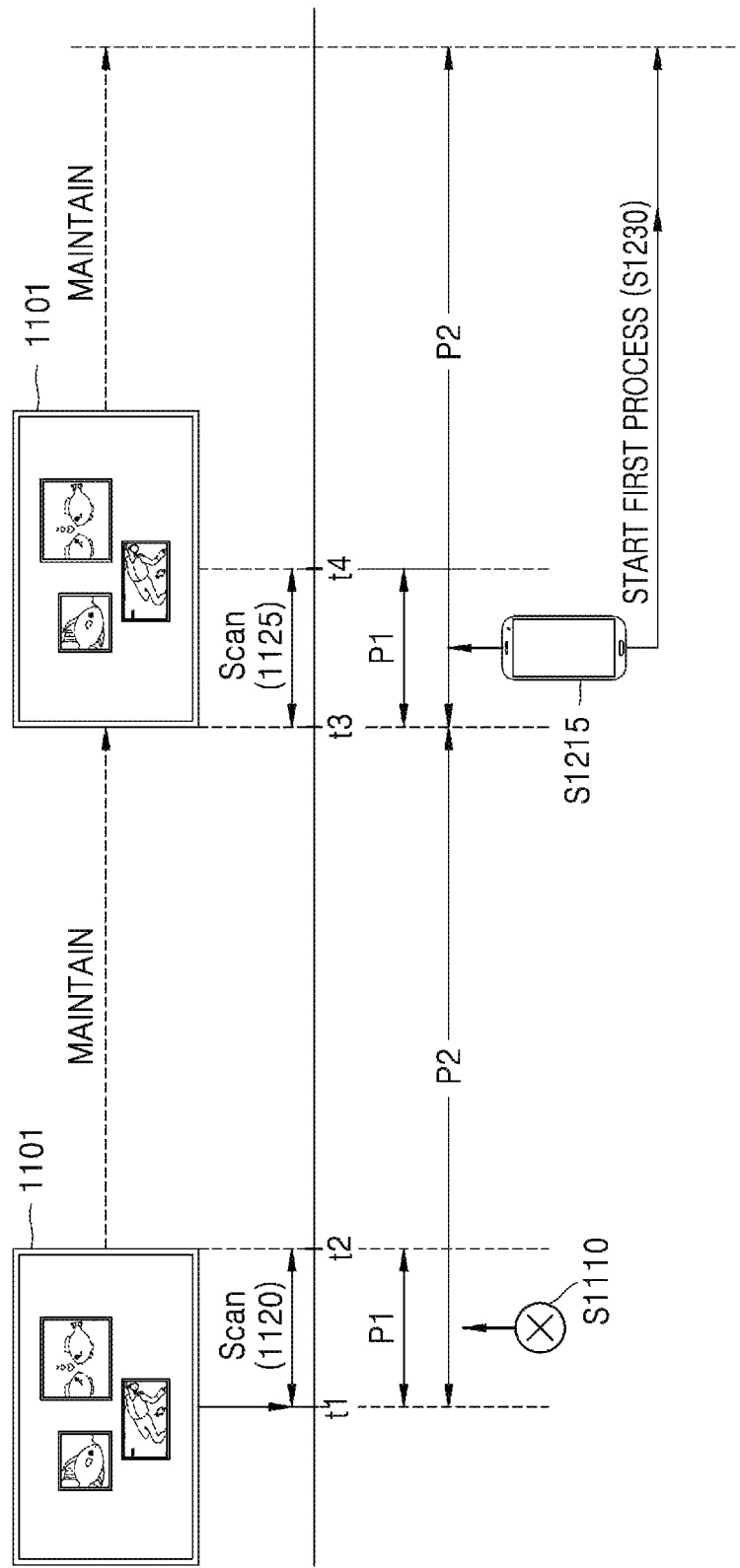
FIG. 12 is a diagram illustrating an example control operation of an ambient service, performed by a display apparatus, according to another embodiment of the disclosure.
Figure 13:
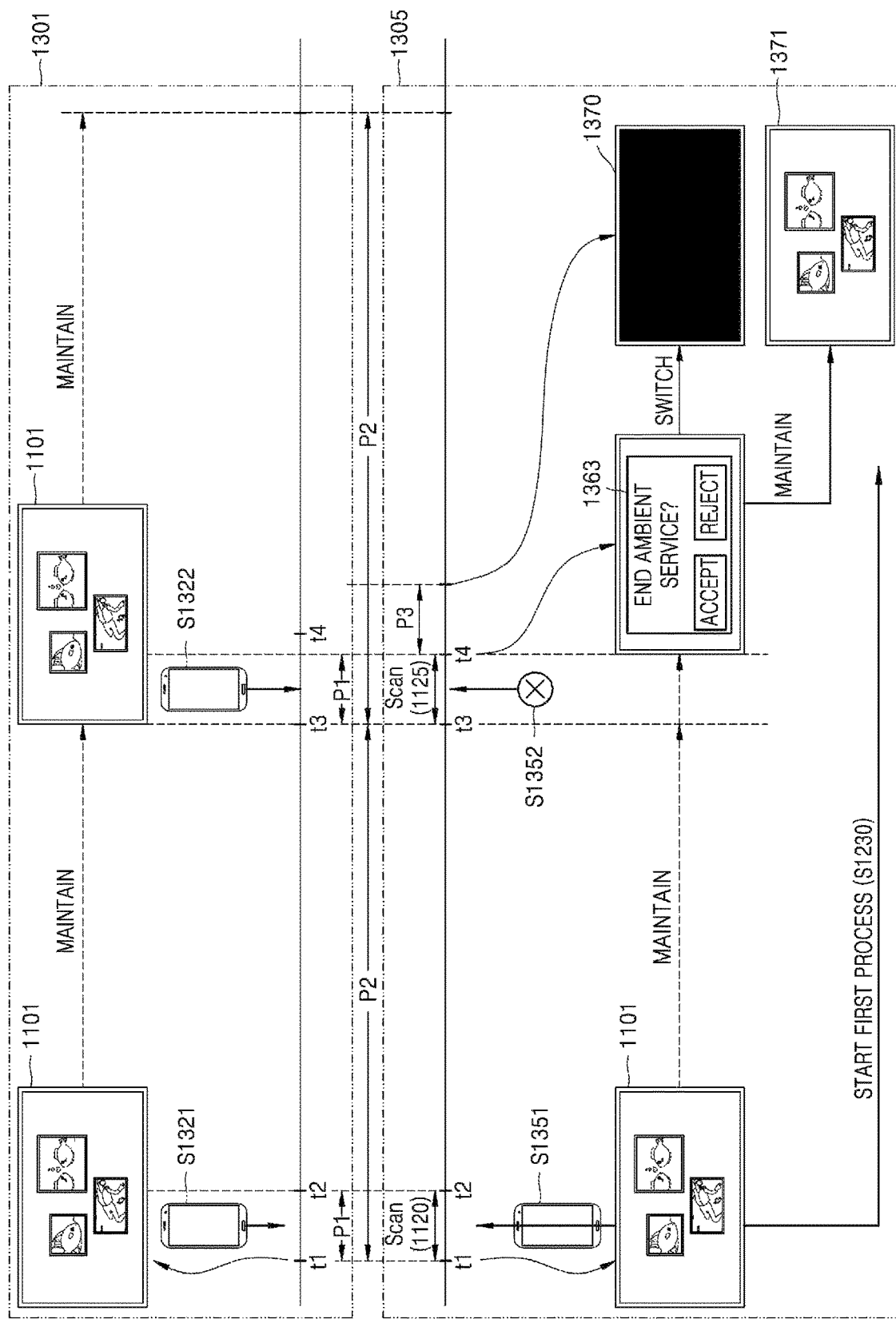
FIG. 13 is a diagram illustrating an example control operation of an ambient service, performed by a display apparatus, according to another embodiment of the disclosure.

In FIGS. 11 to 13, BLE scanning may, for example, be referred to as 'scan'.

Operations illustrated in FIGS. 11 to 13 will be described in greater detail below with respect to the display apparatus 310 illustrated in FIG. 3.

FIG. 11 is a diagram illustrating an example control operation of an ambient service, performed by a display apparatus, according to an example embodiment of the disclosure.

When a mobile device registered to control on or off of the ambient service is not sensed after the first point of time t1 at which the ambient service is started, the controller 311 may control a first process, for automating ending the ambient service, to not be started until the registered mobile device is sensed.

Referring to FIG. 11, the ambient service is started from the first point of time t1, and the display apparatus 310 displays an ambient screen 1101 from the first point of time t1 at which the ambient service is started.

The display apparatus 310 may perform BLE scanning 1120 for a first time period P1 from the first point of time t1 to a second point of time t2.

When the registered mobile device is not sensed as a result of performing BLE scanning 1120 (S1110), the display apparatus 310 may control the ambient service to be on until the registered mobile device is sensed after the first point of time t1.

Referring to FIG. 11, BLE scanning may be performed at intervals of a second time period P2. For example, the first time period P1 may be set to 1 minute, and the second time period P2 may be set to 15 minutes. In this example, BLE scanning may be performed for one minute at 15-minute intervals, but the disclosure is not limited thereto.

In an embodiment of the disclosure, the controller 311, for example, a processor (not shown) included in the controller 311 may determine whether the registered mobile device is sensed for the first time period P1 from the first point of time t1, and re-determine whether the registered mobile device is sensed after the second time period P2 from the first point of time t1 when the registered mobile device is not sensed as a result of the determination. In other words, the processor may re-determine whether the registered mobile device is sensed for the first time period P1 from a third point of time t3 which is later by the second time period P2 than the first point of time t1.

When that the registered mobile device is not sensed as a result of the re-determination, the controller 311, for example, the processor of the controller 311 may identity again whether the registered mobile device is sensed at intervals of the second time period P2 and control the first process to not be started until the registered mobile device is sensed. For example, the controller 311 may repeatedly determine whether the registered mobile device is sensed by performing BLE scanning at intervals of the second time period P2, until the registered mobile device is sensed.

Referring to FIG. 11, when the ambient service is started, the display apparatus 310 may determine whether there is the registered mobile device by performing BLE scanning 1120 for the first time period P1. Because the registered mobile device is not sensed as a result of performing BLE scanning 1120 (S1110), the display apparatus 310 may allow the ambient service to be on. For example, the display apparatus 310 may allow the ambient service to be on until the registered mobile device is sensed subsequently by BLE scanning. Accordingly, the display apparatus 310 may continuously display an ambient screen 1101 for a first time period P1 from the third point of time t3 to a fourth point of time t4, which is a subsequent BLE scan period.

The display apparatus 310 may determine again whether the registered mobile device is sensed by performing BLE scanning 1125 for the first time period P1 from the third point of time t3 to the fourth point of time t4, which is the subsequent BLE scan period. The display apparatus 310 maintains the execution of the ambient service when the registered mobile device is not sensed as a result of performing BLE scanning 1125 (S1115) and thus a screen that is the same as the ambient screen 1101 may be continuously displayed after the third point of time t3 or the fourth point of time t4.

FIG. 12 is a diagram illustrating an example control operation of an ambient service, performed by a display apparatus, according to another example embodiment of the disclosure. Components of FIG. 12 that are the same as those of FIG. 11 are illustrated using the same reference numerals. Thus, a description of operations illustrated in FIG. 12 that are the same as those of FIG. 11 may not be repeated here.

According to an embodiment of the disclosure in relation to performance of operations illustrated in FIG. 11, even when a user of an unregistered mobile device is using the ambient service, the ambient service is not ended because a registered mobile device is not sensed Therefore, it is possible to prevent and/or reduce inconvenience which may be caused to the user of the unregistered mobile device when the ambient service is suddenly ended, thereby increasing user satisfaction.

An embodiment of the disclosure illustrated in FIG. 12 is different from that of FIG. 11, in that a registered mobile device is sensed by BLE scanning 1125 performed for a first time period P1 from a third point of time t3 which is later by a second time period P2 than a first point of time t1.

Referring to FIG. 12, the controller 311, for example, a processor (not shown) included in the controller 311 may determine whether the registered mobile device is sensed for the first time period P1 from the first point of time t1, and re-determine whether the registered mobile device is sensed after the second time period P2 from the first point of time t1 when the registered mobile device is not sensed as a result of the determination. For example, the controller 311 may re-determine whether the registered mobile device is sensed at the third point of time t3 which is later by the second time period P2 than the first point of time t1. As a result of the re-determination, when there is the registered mobile device, the controller 311 may control the first process to be started (S1230). The first process may, for example, be a process of automatically ending the ambient service according to whether the registered mobile device is sensed. When the first process is started, the ambient service may be automatically ended according to a result of sensing the registered mobile device, which is subsequently performed.

For example, in case that the first process is started (S1230), an operation of automatically ending the ambient service is performed when the registered mobile device is not sensed by a subsequent BLE scan operation (for example, BLE scanning performed at a point of time later by the second time period P2 than the third point of time t3 at which BLE scanning 1125 was performed). For example, for automatic ending of the ambient service, the controller 311 may output a user interface screen informing the end of the ambient service. The user interface screen informing the end of the ambient service will be described in greater detail below with reference to FIGS. 14 and 15.

FIG. 13 is a diagram illustrating an example control operation of an ambient service, performed by a display apparatus, according to another example embodiment of the disclosure. Components of FIG. 13 that are the same as those of FIG. 11 are illustrated using the same reference numerals. Thus, a description of operations illustrated in FIG. 13 that are the same as those of FIG. 11 may not be repeated here.

Referring to FIG. 13, operations performed by the display apparatus 310 according to an embodiment of the disclosure when a registered mobile device is sensed after a first point of time t1 at which the ambient service is started (S1321 or S1351) will be described below. For example, a block 1301 illustrates operations of the display apparatus 310 according to an embodiment of the disclosure when the registered mobile device is sensed not only by BLE scanning 1120 performed at the first point of time t1 at which the ambient service is started (S1321) but also by BLE scanning 1125 performed subsequently. A block 1305 illustrates operations of the display apparatus 310 according to an embodiment of the disclosure when the registered mobile device is sensed by BLE scanning 1120 performed at the first point of time t1 at which the ambient service is started (S1351) but is not sensed by BLE scanning 1125 performed subsequently.

The operations of the block 1301 will be described in detail.

In an embodiment of the disclosure, the controller 311, for example, a processor (not shown) included in the controller 311 may determine whether the registered mobile device is sensed for a first time period P1 from the first point of time t1, and control the first process to be started when the registered mobile device is sensed as a result of the determination.

Referring to the block 1301 of FIG. 13, when the ambient service is started, the display apparatus 310 may determine whether the registered mobile device is sensed by performing BLE scanning 1120 for the first time period P1. When the registered mobile device is sensed as a result of performing BLE scanning 1120, the first process is controlled to be started (S1230).

The first process may be a process of determining whether to automatically end the ambient service according to a result of performing scanning to sense the registered mobile device. For example, according to the first process, the display apparatus 310 may re-determine whether the registered mobile device is sensed for the first time period P1 from a third point of time t3 which is later by a second time period P2 from the first point of time t1, and perform operations of ending the ambient service when the registered mobile device is not sensed as a result of the re-determination. When the registered mobile device is sensed as the result of the re-determination (S1322), the display apparatus 310 performs BLE scanning 1125 again after a certain time period (e.g., the second time period P2) while maintaining the ambient service.

The operations of the block 1305 will be described in detail.

In an embodiment of the disclosure, the controller 311, for example, the processor of the controller 311 may determine whether the registered mobile device is sensed for the first time period P1 from the first point of time t1, and control the first process to be started when the registered mobile device is sensed as a result of the determination (S1230). 'S1351' illustrated in the block 1305 denotes sensing the registered mobile device and corresponds to the operation S1321 illustrated in the block 1301, and thus a detailed description thereof will not be repeated here.

Referring to the block 1305 of FIG. 13, when the first process is started (S1230), BLE scanning 1125 is performed after a certain time period (e.g., the second period time P2) while maintaining the ambient service, because the registered mobile device is sensed by BLE scanning 1120. For example, the controller 311, for example, the processor of the controller 311 determines whether the registered mobile device is sensed for the first time period P1 from the first point of time t1, and performs operations, which will be described below, when the registered mobile device is sensed as a result of the determination.

Because the controller 311 maintains the ambient service, an ambient screen 1101 is controlled to be continuously displayed on the display 317.

The controller 311 may re-determine whether the registered mobile device is sensed for the first time period P1 from the third point of time t3 which is later by the second time period P2 than the first point of time t1, and perform an operation of ending the ambient service when the registered mobile device is not sensed as a result of the re-determination (S1352). The re-determination described above may be performed, for example, by BLE scanning 1125.

For example, when the registered mobile device is not sensed as the result of the re-determination (S1352), the controller 311 may output a first user interface screen (not shown) informing the end of the ambient service and automatically end execution of the ambient service.

For example, the first user interface screen may be a user interface screen containing a notification message such as "ambient service will be ended after one minute" or "ambient service will be ended". Thus, the controller 311 may control the ambient service to be off immediately after the output of the first user interface screen or after a third time interval P3 after the output of the first user interface screen. Accordingly, a screen of the display 317 of the display apparatus 310 may be changed from the ambient screen 1101 to a black screen 1370.

When the registered mobile device is not sensed as the result of the re-determination (S1352), the controller 311 may output a second user interface screen 1363 for selecting whether or not to execute the ambient service, and determine whether the ambient service is to be ended or not, based on a user input received via the second user interface screen 1363.

For example, when the user input received via the second user interface screen 1363 corresponds to accepting the end of the ambient service, the controller 311 may control the ambient service to be off immediately after the output of the second user interface screen 1363 or after a third time period P3 after the output of the second user interface screen 1363. Accordingly, the screen of the display 317 of the display apparatus 310 may be changed from the ambient screen 1101 to the black screen 1370.

When the user input received via the second user interface screen 1363 corresponds to rejecting the end of the ambient service, the controller 311 may control the ambient service to be maintained. Accordingly, the display apparatus 310 may continuously display an ambient screen 1371 on the display 317.

Figure 14:
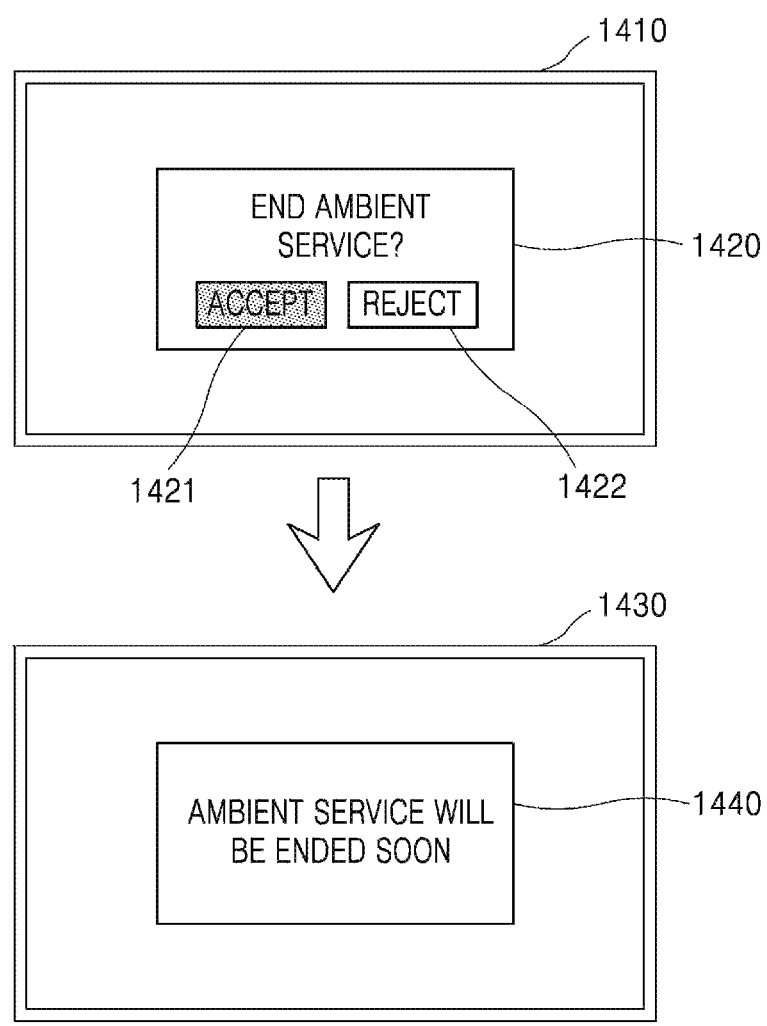
FIG. 14 is a diagram illustrating an example user interface screen output from a display apparatus, according to an embodiment of the disclosure.

FIG. 14 is a diagram illustrating an example user interface screen output from a display apparatus according to an example embodiment of the disclosure. In FIG. 14, a screen 1410 may correspond to the second user interface screen 1363 of FIG. 13.

Referring to FIG. 14, the display apparatus 310 may output the screen 1410 for selecting whether to execute the ambient service. The screen 1410 may include a menu 1420 for selecting whether to execute the ambient service. The menu 1420 may include a key 1421 to accept the end of the ambient service and a key 1422 to refuse the end of the ambient service.

When a user selects the key 1421 to accept the end of the ambient service through the user interface 550, the controller 311 may control the ambient service to be ended. For example, the controller 311 may control the display apparatus 310 to be turned off after a screen 1430 containing a message 1440 informing the end of the ambient service is output.

Figure 15:
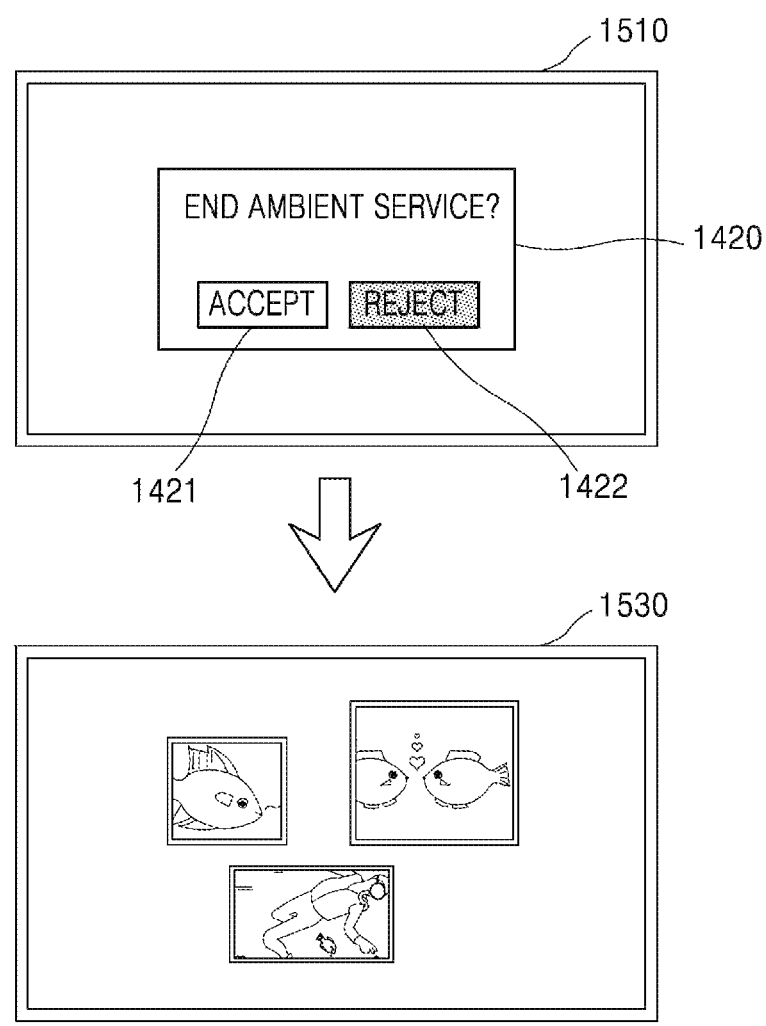
FIG. 15 is a diagram illustrating an example user interface screen output from a display apparatus, according to another embodiment of the disclosure.

FIG. 15 is a diagram illustrating an example user interface screen output from a display apparatus according to another example embodiment of the disclosure. In FIG. 15, a screen 1510 may correspond to the second user interface screen 1363 of FIG. 13. Components of FIG. 15 that are the same as those of FIG. 14 are illustrated using the same reference numerals. Thus, a description of parts of FIG. 15 that are the same as those of FIG. 14 may not be repeated here.

Referring to FIG. 15, the display apparatus 310 may output a screen 1510 for selecting whether to execute the ambient service. When a user selects a key 1422 to reject the end of the ambient service through the user interface 550, the controller 311 may control the ambient service to be maintained. Accordingly, the display apparatus 310 may continuously display an ambient screen 1530 on the display 317.

A control method of a display apparatus according to one or more example embodiments of the disclosure may include operations performed by a display apparatus (e.g., the display apparatus 310) as described above, and may include the same or similar technical idea as a display apparatus of an embodiment of the disclosure.

A control method of a display apparatus and a display apparatus therefor according to an embodiment of the disclosure are capable of controlling an operation of the ambient service using BLE to meet a user's intention.

For example, the control method of a display apparatus and a display apparatus therefor according to embodiments of the disclosure are capable of maintaining the ambient service without ending the execution of the ambient service even when a registered user is not located near the display apparatus. Accordingly, users other than the registered user may be provided with the ambient service to increase the users' satisfaction.

A control method of a display apparatus according to one or more example embodiments of the disclosure may be embodied in the form of program instructions executable through various computer means and recorded on a computer-readable recording medium. Furthermore, an embodiment of the disclosure may be embodied as a computer-readable recording medium storing one or more programs including instructions for execution of the control method of a display apparatus described above.

The computer-readable recording medium may include program instructions, data files, data structures, etc. solely or in combination. The program instructions recorded on this recording medium may be specially designed and configured for the disclosure or may be known and available to those skilled in the field of computer software. Examples of the computer-readable recording medium include magnetic media such as hard disks, floppy disks and magnetic tapes, optical media such as CD-ROMs and DVDs, magneto-optical media such as flopical disks, and hardware devices such as ROM, RAM, flash memory, and the like which are configured to store and execute program instructions. Examples of the program instructions include not only machine language codes made by a compiler, but also high-level language codes executable by an interpreter.

A control method of a display apparatus according to one or more example embodiments of the disclosure described above may be embodied as a computer program product with a recording medium storing a program for obtaining a sentence written in multiple languages, and obtaining, using a multilingual translation model, vector values corresponding to words included in the sentence written in the multiple languages, converting the vector values into vector values corresponding to a target language, and obtaining a sentence written in the target language, based on the vector values corresponding to the target language.

While various example embodiments of the disclosure have been illustrated and described above, the scope of the disclosure is not limited thereto and should be understood to include various modifications and improvements made by those of ordinary skill in the art, based on basic principles of the disclosure as may be defined, for example, in the following claims.

What is claimed is:

1. A display apparatus comprising: a display;
a memory configured to store instructions;
a communicator comprising communication circuitry configured to communicate with a mobile device via at least one wireless network; and
a controller including at least one processor configured to execute the instructions stored in the memory,
wherein the instructions, when executed by the at least one processor, control the display apparatus to:
start execution of a predetermined application which is an application for displaying a content image on the display;
during execution of the predetermined application, identify, through the communicator, presence of a registered mobile device which was previously paired with the display apparatus to determine whether to start a process for automatically ending the execution of the predetermined application, the process configured to automatically end the execution of the predetermined application based on the presence of the registered mobile device;
in response to the presence of the registered mobile device being identified after the predetermined application is executed, maintain the execution of the predetermined application and control the process to be started to automatically end the execution of predetermined application based on the presence of the registered mobile device; and
in response to the presence of the registered mobile device not being identified after the predetermined application is executed, maintain the execution of the predetermined application and control the process to not be started until the presence of the registered mobile device is identified through the communicator.

2. The display apparatus of claim 1, wherein the predetermined application displays a painting, a photograph, or a clock.

3. The display apparatus of claim 1, wherein the predetermined application is an application for providing an ambient service.

4. The display apparatus of claim 1, wherein
the instructions, when executed by the at least one processor, control the display apparatus to:
determine whether the registered mobile device is sensed based on a Bluetooth low energy (BLE) signal received via a BLE network.

5. The display apparatus of claim 1, wherein the process comprises:
a process determining whether the predetermined application is to be automatically ended based on a result of performing scanning to sense the registered mobile device.

6. The display apparatus of claim 1, wherein
the instructions, when executed by the at least one processor, control the display apparatus to:
determine whether the registered mobile device is sensed for a first time period from a first point in time at which an execution of the predetermined application is started, and
re-determine whether the registered mobile device is sensed after a second time period from the first point in time in response to the registered mobile device not being sensed as a result of the determination.

7. The display apparatus of claim 6, wherein
the instructions, when executed by the at least one processor, control the display apparatus to:
re-determine whether the registered mobile device is sensed at intervals of the second time period based on the registered mobile device not being sensed as a result of the re-determination, and control the process to not be started until the registered mobile device is sensed.

8. The display apparatus of claim 6, wherein
the instructions, when executed by the at least one processor, control the display apparatus to:
control the process to be started based on the registered mobile device being sensed as a result of the re-determination.

9. The display apparatus of claim 1, wherein
the instructions, when executed by the at least one processor, control the display apparatus to:
determine whether the registered mobile device is sensed for a first time period from a first point in time at which an execution of the predetermined application is started, and control the process to be started based on the registered mobile device being sensed as a result of the determination.

10. The display apparatus of claim 9, wherein
the instructions, when executed by the at least one processor, control the display apparatus to:
re-determine whether the registered mobile device is sensed for the first time period from a second point in time in response to the registered mobile being sensed as a result of the determination, and perform an operation of ending the predetermined application based on the registered mobile not being sensed as a result of the re-determination, the second point in time being later than the first point in time.

11. The display apparatus of claim 10, wherein
the instructions, when executed by the at least one processor, control the display apparatus to:
output a first user interface screen informing an end of the predetermined application in response to the registered mobile device not being sensed as a result of the re-determination, and automatically end execution of the predetermined application.

12. The display apparatus of claim 11 wherein
the instructions, when executed by the at least one processor, control the display apparatus to:
output a second user interface screen for selecting whether the predetermined application is to be executed based on the registered mobile device not being sensed as a result of the re-determination, and determine whether the predetermined application is to be ended, based on a user input received through the second user interface screen.

13. The display apparatus of claim 12, wherein
the instructions, when executed by the at least one processor, control the display apparatus to:
control the predetermined application to be maintained in response to a user input corresponding to rejection of the end of the predetermined application being received through the second user interface screen.

14. A control method of a display apparatus capable of providing an predetermined application, the control method comprising:
starting execution of the predetermined application;
during execution of the predetermined application, identifying presence of a registered mobile device which was previously paired with the display apparatus to determine whether to start a process for automatically ending the execution of the predetermined application, the process configured to automatically end the execution of the predetermined application based on the presence of the registered mobile device;
in response to the presence of the registered mobile device being identified after the predetermined application is executed, maintaining the execution of the predetermined application and controlling the process to be started to automatically end the execution of predetermined application based on the presence of the registered mobile device; and
in response to the presence of the registered mobile device not being identified after the predetermined application is executed, maintaining the execution of the predetermined application and controlling the process to not be started until the presence of the registered mobile device is identified.

15. The display apparatus of claim 1, wherein
the instructions, when executed by the at least one processor, are further configured to control the display apparatus to:
perform a first scan operation to identify the presence of a registered mobile device during a first time period after the execution of the predetermined application is started, and
in response to the presence of the registered mobile device not being identified via the first scanning operation, control the process to not be started during second time period following the first time period and perform a second scan operation to identify the presence of a registered mobile device during a third time period following the second time period.

16. The control method of claim 14, wherein
the controlling of the process to not be started comprises:
controlling the predetermined application to be on until the registered mobile device is sensed after a first point in time.

17. The control method of claim 14, further comprising:
determining whether the registered mobile device is sensed based on a Bluetooth low energy (BLE) signal received via a BLE network.

18. The control method of claim 14, wherein the process comprises:
a process of determining whether the predetermined application is to be automatically ended based on a result of performing scanning to sense the registered mobile device.

19. The control method of claim 14, further comprising
determining whether the registered mobile device is sensed for a first time period from a first point in time at which execution of the predetermined application is started based on a Bluetooth low energy (BLE) signal received via a BLE network, and
wherein the controlling of the process to not be started comprises:
determining again whether the registered mobile device is sensed after a second time period from the first point in time based on the registered mobile device not being sensed as a result of the determination.

20. The control method of claim 14, further comprising:
determining whether the registered mobile device is sensed for a first time period from the first point in time based on a Bluetooth low energy (BLE) signal received via a BLE network, and
wherein the controlling of the process to not be started comprises:
re-determining whether the registered mobile device is sensed after a second time period from a first point in time at which execution of the predetermined application is started based on the registered mobile device not being sensed as a result of the determination; and
controlling the process to be started based on the registered mobile device being sensed as a result of the re-determination.

21. The control method of claim 14, further comprising:
determining whether the registered mobile device is sensed for a first time period from the first point in time based on a Bluetooth low energy (BLE) signal received via a BLE network, and
wherein the controlling of the process to not be started comprises controlling the process to be started based on the registered mobile device being sensed.

22. The control method of claim 20, wherein
the controlling of the process to not be started comprises:
re-determining whether the registered mobile device is sensed for the first time period from a third point in time when the process is started, the third point in time being later by a second time period than the first point of time; and
executing an operation of ending the predetermined application based on the registered mobile device not being sensed as a result of the re-determination.

\* \* \* \* \*